United States Patent
Ueno et al.

(10) Patent No.: US 10,771,921 B2
(45) Date of Patent: Sep. 8, 2020

(54) PEDESTRIAN TERMINAL DEVICE, VEHICLE-MOUNTED TERMINAL DEVICE, PEDESTRIAN-TO-VEHICLE COMMUNICATION CONTROL DEVICE, PEDESTRIAN-TO-VEHICLE COMMUNICATION SYSTEM, AND PEDESTRIAN-TO-VEHICLE COMMUNICATION METHOD

(71) Applicant: PANASONIC INTELLECTUAL PROPERTY MANAGEMENT CO., LTD., Osaka (JP)

(72) Inventors: Tsuyoshi Ueno, Kanagawa (JP); Yoshimasa Shirosaki, Kanagawa (JP); Satoshi Tanaka, Kochi (JP); Hiroaki Sudo, Kanagawa (JP); Yoshiyuki Okubo, Kanagawa (JP); Shintaro Muramatsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 190 days.

(21) Appl. No.: 15/768,346

(22) PCT Filed: Sep. 28, 2016

(86) PCT No.: PCT/JP2016/004367
§ 371 (c)(1),
(2) Date: Apr. 13, 2018

(87) PCT Pub. No.: WO2017/104093
PCT Pub. Date: Jun. 22, 2017

(65) Prior Publication Data
US 2018/0302752 A1 Oct. 18, 2018

(30) Foreign Application Priority Data
Dec. 18, 2015 (JP) .................. 2015-247505

(51) Int. Cl.
*G01M 17/00* (2006.01)
*G06F 7/00* (2006.01)
(Continued)

(52) U.S. Cl.
CPC ............ *H04W 4/025* (2013.01); *B60W 50/14* (2013.01); *G08G 1/005* (2013.01); *G08G 1/162* (2013.01);
(Continued)

(58) Field of Classification Search
CPC ......... H04W 4/025; H04W 4/44; H04W 4/80; H04W 4/40; H04W 4/08; B60W 50/14; G08G 1/005; G08G 1/162; G08G 1/166
(Continued)

(56) References Cited

U.S. PATENT DOCUMENTS

2014/0191884 A1\* 7/2014 Maeda .................. G08G 1/163
340/944
2017/0018187 A1\* 1/2017 Kim ....................... G08G 1/166

FOREIGN PATENT DOCUMENTS

JP  2009-045956  3/2009
JP  2009-239584  10/2009
(Continued)

OTHER PUBLICATIONS

International Search Report issued in International Patent Application No. PCT/JP2016/004367, dated Dec. 20, 2016.

*Primary Examiner* — Mahmoud S Ismail
(74) *Attorney, Agent, or Firm* — Greenblum & Bernstein, P.L.C.

(57) ABSTRACT

A pedestrian terminal device receives pedestrian information transmitted from another pedestrian terminal device which is present in the vicinity of the pedestrian terminal device. A location of the pedestrian terminal device is acquired, and it is determined whether or not a pedestrian
(Continued)

who carries the pedestrian terminal device is located inside a pedestrian group based on the location of the pedestrian terminal device and a location of the other pedestrian terminal device included in the pedestrian information. When the pedestrian is located inside the pedestrian group, pedestrian-vehicle communication is stopped.

11 Claims, 18 Drawing Sheets

(51) Int. Cl.
*H04W 4/02* (2018.01)
*H04W 4/40* (2018.01)
*H04W 4/08* (2009.01)
*H04W 4/44* (2018.01)
*G08G 1/005* (2006.01)
*G08G 1/16* (2006.01)
*H04W 4/80* (2018.01)
*B60W 50/14* (2020.01)
*H04M 1/725* (2006.01)

(52) U.S. Cl.
CPC .............. *G08G 1/166* (2013.01); *H04W 4/08* (2013.01); *H04W 4/40* (2018.02); *H04W 4/44* (2018.02); *H04W 4/80* (2018.02); *B60W 2050/146* (2013.01); *H04M 1/72527* (2013.01); *H04W 4/023* (2013.01)

(58) Field of Classification Search
USPC ......................................... 701/32.3; 340/944
See application file for complete search history.

(56) References Cited

FOREIGN PATENT DOCUMENTS

| | | |
|---|---|---|
| JP | 4862693 | 11/2011 |
| JP | 2011-253403 | 12/2011 |
| JP | 2013-115721 | 6/2013 |

* cited by examiner

PEDESTRIAN TERMINAL DEVICE, VEHICLE-MOUNTED TERMINAL DEVICE, PEDESTRIAN-TO-VEHICLE COMMUNICATION CONTROL DEVICE, PEDESTRIAN-TO-VEHICLE COMMUNICATION SYSTEM, AND PEDESTRIAN-TO-VEHICLE COMMUNICATION METHOD

CROSS-REFERENCE TO RELATED APPLICATIONS

This application is a National Phase of PCT International Application No. PCT/JP2016/004367 filed on Sep. 28, 2016, which claims priority under 35 U.S.C § 119(a) to Japanese Patent Application No. 2015-247505 filed on Dec. 18, 2015. Each of the above applications is hereby expressly incorporated by reference, in its entirety, into the present application.

TECHNICAL FIELD

The present disclosure relates to a pedestrian terminal device which is carried by a pedestrian and performs pedestrian-vehicle communication with a vehicle-mounted terminal device, a vehicle-mounted terminal device which is mounted on a vehicle and performs pedestrian-vehicle communication with the pedestrian terminal device, a pedestrian-to-vehicle communication control device which controls pedestrian-vehicle communication performed between the vehicle-mounted terminal device and the pedestrian terminal device, and a pedestrian-to-vehicle communication system and a pedestrian-to-vehicle communication method for performing pedestrian-vehicle communication between the vehicle-mounted terminal device and the pedestrian terminal device.

BACKGROUND ART

In recent years, investigation has been made toward commercialization and distribution of a safe driving support wireless system using an intelligent transport system (ITS). In the safe driving support wireless system, it is necessary to attract attention of a driver of a vehicle to avoid an accident by communicating location information or the like of the vehicle by inter-vehicle communication in which vehicle-mounted terminal devices mounted on the vehicle communicate with each other, or by road-to-vehicle communication for communication between a road-side device installed on a roadway and a vehicle-mounted terminal device.

In recent years, in order to prevent a pedestrian accident, a pedestrian-vehicle communication for communication between a pedestrian terminal device carried by a pedestrian and a vehicle-mounted terminal device has been proposed. In the pedestrian-vehicle communication, the pedestrian terminal device and the vehicle-mounted terminal device communicate with each other directly so that it is possible to attract attention of both of the pedestrian and the driver of the vehicle at an appropriate timing, and thus, great effect is expected in preventing pedestrian accidents.

Now, in a situation in which there are many pedestrians and vehicles similar to intersections of downtown areas and roadways around event sites, such as fireworks festivals, as the number of pedestrian terminal devices and vehicle-mounted terminal devices increases, the traffic of pedestrian-vehicle communication increases, and there is a concern that congestion of pedestrian-vehicle communication occurs.

Therefore, it is desirable to reduce the frequency of pedestrian-vehicle communication, and to reduce the traffic of pedestrian-vehicle communication. In particular, since the number of pedestrians is often greater than the number of vehicles, reducing the frequency of pedestrian-vehicle communication in the pedestrian terminal device is effective in reducing the traffic of pedestrian-vehicle communication.

As a technology related to reducing the frequency of pedestrian-vehicle communication in such a pedestrian terminal device, in the related art, based on the location, moving speed, traveling direction, and the like of a pedestrian and a vehicle, by acquiring the risk of collision of a vehicle with a pedestrian, the communication control is performed in accordance with the risk, and in particular, in the pedestrian terminal device having a low risk, a technology of stopping the transmission of pedestrian information is known (refer to PTL 1). In addition, a technology in which the risk of collision of a vehicle with a pedestrian is acquired, the pedestrian terminal device having a high risk becomes a delegate terminal, the pedestrian terminal device having a low risk exchanges information with a vehicle-mounted terminal device via the pedestrian terminal device which is the delegate terminal, is known (refer to PTL 2).

CITATION LIST

Patent Literature

PTL 1: Japanese Patent Unexamined Publication No. 2011-253403

PTL 2: Japanese Patent No. 4862693

SUMMARY OF THE INVENTION

However, in the technology disclosed in PTL 1, since communication control is performed based on the risk, when the risk is similarly high by multiple pedestrian terminal devices at a place being crowded with the pedestrians, the multiple pedestrian terminal devices are in a state of transmitting pedestrian information, and there is a problem that pedestrian-vehicle communication cannot be sufficiently suppressed. In addition, in the technology disclosed in PTL 2, since pedestrian-vehicle communication similar to a normal case where the delegate terminal is not selected is continued even after the delegate terminal is selected, there is a problem that the pedestrian-vehicle communication cannot be sufficiently suppressed.

The present disclosure has been devised to solve such problems of the related art and a main object thereof is to provide a pedestrian terminal device, a vehicle-mounted terminal device, a pedestrian-to-vehicle communication control device, a pedestrian-to-vehicle communication system, and a pedestrian-to-vehicle communication method, which are configured to be capable of sufficiently suppressing the pedestrian-vehicle communication between the pedestrian terminal device and the vehicle-mounted terminal device, and reducing communication congestion due to an increase in traffic in pedestrian-vehicle communication, even in a crowded situation in which multiple pedestrians and vehicles gather.

According to an aspect of the disclosure, there is provided a pedestrian terminal device which is carried by a pedestrian and performs pedestrian-vehicle communication with a vehicle-mounted terminal device, the pedestrian terminal device including: a location information acquirer which acquires location information of the pedestrian terminal device; a pedestrian-vehicle communicator which transmits and receives notification information to and from the vehicle-mounted terminal device by the pedestrian-vehicle communication; and a controller for controlling the pedestrian-vehicle communicator, in which the pedestrian-vehicle communicator receives notification information transmitted from another pedestrian terminal device that exists in the vicinity of the pedestrian terminal device, and in which the controller determines whether or not the pedestrian who carries the pedestrian terminal device is located on the inside of a pedestrian group based on the location information of the pedestrian terminal device and the location information of the other pedestrian terminal device included in the notification information, and stops the pedestrian-vehicle communication in a case where the pedestrian is located on the inside of the pedestrian group.

According to another aspect of the disclosure, there is provided a vehicle-mounted terminal device which is mounted on a vehicle and performs pedestrian-vehicle communication with a pedestrian terminal device, the vehicle-mounted terminal device including: a location information acquirer which acquires location information of the vehicle-mounted terminal device; a pedestrian-vehicle communicator which transmits and receives notification information to and from the pedestrian terminal device by the pedestrian-vehicle communication; and a controller for controlling the pedestrian-vehicle communicator, in which the pedestrian-vehicle communicator receives notification information transmitted from another vehicle-mounted terminal device that exists in the vicinity of the vehicle-mounted terminal device, and in which the controller determines whether or not a vehicle on which the vehicle-mounted terminal device is mounted is located on the inside of a vehicle group based on the location information of the vehicle-mounted terminal device and the location information of the other vehicle-mounted terminal device included in the notification information, and stops the pedestrian-vehicle communication in a case where the vehicle is located on the inside of the vehicle group.

According to still another aspect of the disclosure, there is provided a pedestrian-to-vehicle communication control device which controls pedestrian-vehicle communication performed between a vehicle-mounted terminal device mounted on a vehicle and a pedestrian terminal device carried by a pedestrian, the pedestrian-to-vehicle communication control device including: a communicator which communicates with each of a plurality of the pedestrian terminal devices; and a controller which controls pedestrian-vehicle communication in each of the plurality of the pedestrian terminal devices; in which the communicator receives location information transmitted from each of the plurality of the pedestrian terminal devices, and in which the controller determines whether or not a pedestrian who carries each of the plurality of the pedestrian terminal devices is located on the inside of the pedestrian group based on the location information of each of the plurality of the pedestrian terminal devices, and instructs the pedestrian terminal device to stop the pedestrian-vehicle communication in a case where the pedestrian is located on the inside of the pedestrian group.

According to still another aspect of the disclosure, there is provided a pedestrian-to-vehicle communication system which includes a vehicle-mounted terminal device mounted on a vehicle and a pedestrian terminal device carried by a pedestrian, and which performs pedestrian-vehicle communication between the vehicle-mounted terminal device and the pedestrian terminal device, in which the pedestrian terminal device includes a location information acquirer which acquires location information of the pedestrian terminal device, a pedestrian-vehicle communicator which transmits and receives notification information to and from the vehicle-mounted terminal device by the pedestrian-vehicle communication, and a controller for controlling the pedestrian-vehicle communicator, in which the pedestrian-vehicle communicator receives notification information transmitted from another pedestrian terminal device that exists in the vicinity of the pedestrian terminal device, and in which the controller determines whether or not a pedestrian who carries the pedestrian terminal device is located on the inside of the pedestrian group based on the location information of the pedestrian terminal device and the location information of the other pedestrian terminal device included in the notification information, and stops the pedestrian-vehicle communication in a case where the pedestrian is located on the inside of the pedestrian group.

According to still another aspect of the disclosure, there is provided a pedestrian-to-vehicle communication method for performing pedestrian-vehicle communication between a vehicle-mounted terminal device mounted on a vehicle and a pedestrian terminal device carried by a pedestrian, the method including: by the pedestrian terminal device, acquiring location information of the pedestrian terminal device; receiving location information transmitted from another pedestrian terminal device that exists in the vicinity of the pedestrian terminal device; and determining whether or not a pedestrian who carries the pedestrian terminal device is located on the inside of the pedestrian group based on the location information of the pedestrian terminal device and the location information of the other pedestrian terminal device and, in a case where the pedestrian is located on the inside of the pedestrian group, stopping the pedestrian-vehicle communication.

According to the present disclosure, in the pedestrian terminal device of the pedestrian located on the inside of the pedestrian group, in order to stop the pedestrian-vehicle communication, it is possible to reduce the number of pedestrian terminal devices which perform the pedestrian-vehicle communication. Accordingly, even in a situation in which multiple pedestrians are gathering, it possible to sufficiently suppress the pedestrian-vehicle communication, and to reduce communication congestion due to an increase in traffic in the pedestrian-vehicle communication.

DESCRIPTION OF EMBODIMENTS

Figure 1:
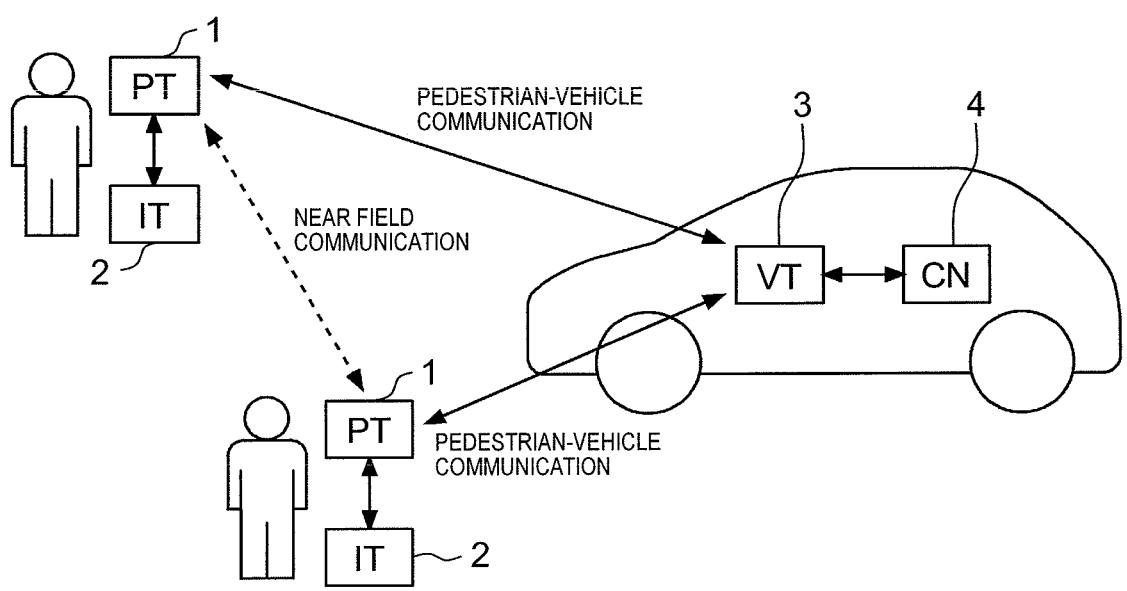
FIG. 1 is an overall configuration view of a pedestrian-to-vehicle communication system according to a first embodiment.

According to a first disclosure for solving the above-described problem, there is provided a pedestrian terminal device which is carried by a pedestrian and performs pedestrian-vehicle communication with a vehicle-mounted terminal device, the pedestrian terminal device including: a location information acquirer which acquires location information of the pedestrian terminal device; a pedestrian-vehicle communicator which transmits and receives notification information to and from the vehicle-mounted terminal device by the pedestrian-vehicle communication; and a controller for controlling the pedestrian-vehicle communicator, in which the pedestrian-vehicle communicator receives notification information transmitted from another pedestrian terminal device that exists in the vicinity of the pedestrian terminal device, and in which the controller determines whether or not the pedestrian who carries the pedestrian terminal device is located on the inside of a pedestrian group based on the location information of the pedestrian terminal device and the location information of the other pedestrian terminal device included in the notification information, and stops the pedestrian-vehicle communication in a case where the pedestrian is located on the inside of the pedestrian group.

According to this, in the pedestrian terminal device of the pedestrian located on the inside of the pedestrian group, in order to stop the pedestrian-vehicle communication, it is possible to reduce the number of pedestrian terminal devices which perform pedestrian-vehicle communication. Accordingly, even in a situation in which multiple pedestrians are gathering, it possible to sufficiently suppress the pedestrian-vehicle communication, and to reduce communication congestion due to an increase in traffic in the pedestrian-vehicle communication.

According to a second disclosure, a near field communicator which transmits and receives notification information to and from the other pedestrian terminal device by near field communication, is further provided, and, in a case of stopping the pedestrian-vehicle communication, the notification information is transmitted and received by the near field communication to and from the other pedestrian terminal device that does not stop the pedestrian-vehicle communication.

According to this, in order to transmit and receive the notification information by the near field communication between the pedestrian terminal device which stopped the pedestrian-vehicle communication and the pedestrian terminal device that continues the pedestrian-vehicle communication, even with the pedestrian terminal device which stopped the pedestrian-vehicle communication, it is possible to acquire the vehicle information of the vehicle-mounted terminal device via the pedestrian terminal device which continues the pedestrian-vehicle communication, and to provide the pedestrian Information of the pedestrian himself of herself to the vehicle-mounted terminal device.

According to a third disclosure, a near field communicator which transmits and receives notification information to and from the other pedestrian terminal device by near field communication, is further provided, and, in a case where the pedestrian-vehicle communication is not stopped, the notification information is transmitted and received by the near field communication to and from the other pedestrian terminal device which stopped the pedestrian-vehicle communication.

According to this, in order to transmit and receive the notification information by the near field communication between the pedestrian terminal device which stopped the pedestrian-vehicle communication and the pedestrian terminal device that continues the pedestrian-vehicle communication, even with the pedestrian terminal device which stopped the pedestrian-vehicle communication, it is possible to acquire the vehicle information of the vehicle-mounted terminal device via the pedestrian terminal device which continues the pedestrian-vehicle communication, and to provide the pedestrian Information of the pedestrian himself of herself to the vehicle-mounted terminal device.

According to a fourth disclosure, the controller determines whether or not the pedestrian is located on the inside of the pedestrian group, depending on whether or not the pedestrian who carries the pedestrian terminal device is in an enclosure status of being surrounded by other nearby pedestrians.

According to this, without grasping the entire pedestrian group, that is, without grasping the locations of all of the pedestrians who form the pedestrian group, it is possible to determine whether or not the pedestrian is located on the inside of the pedestrian group.

According to a fifth disclosure, the controller stops the pedestrian-vehicle communication in a case where the pedestrian who carries the pedestrian terminal device is not at a location close to a high-risk area, based on location information of the pedestrian terminal device and the location information of the other pedestrian terminal device and map information.

According to this, it is possible to further reduce the number of pedestrian terminal devices which perform the pedestrian-vehicle communication while ensuring pedestrian safety.

According to a sixth disclosure, the controller transmits and receives the notification information by the near field communication with the other pedestrian terminal device having a similar risk situation, based on the location information of the pedestrian terminal device and the location information of the other pedestrian terminal device and map information.

According to this, since pedestrian terminal devices which transmit and receive notification information by near field communication attract attention of each other based on the same vehicle information acquired from the vehicle-mounted terminal device, by transmitting and receiving notification information by near field communication between pedestrian terminal devices of which situation about risk determination is the same, it is possible to appropriately attract attention.

According to a seventh disclosure, the controller stops the pedestrian-vehicle communication in a case where a pedestrian terminal device carried by a person who conducts traffic guarding security within a predetermined range centering on the pedestrian who carries the pedestrian terminal device exists, based on location information of the pedestrian terminal device and location information and person identification information of the other pedestrian terminal device included in the notification information.

According to this, it is possible to further reduce the number of pedestrian terminal devices which perform the pedestrian-vehicle communication while ensuring pedestrian safety.

According to an eighth disclosure, there is provided a vehicle-mounted terminal device which is mounted on a vehicle and performs pedestrian-vehicle communication with a pedestrian terminal device, the vehicle-mounted terminal device including: a location information acquirer which acquires location information of the vehicle-mounted terminal device; a pedestrian-vehicle communicator which transmits and receives notification information to and from the pedestrian terminal device by the pedestrian-vehicle communication; and a controller for controlling the pedestrian-vehicle communicator, in which the pedestrian-vehicle communicator receives notification information transmitted from another vehicle-mounted terminal device that exists in the vicinity of the vehicle-mounted terminal device, and in which the controller determines whether or not a vehicle on which the vehicle-mounted terminal device is mounted is located on the inside of a vehicle group based on the location information of the vehicle-mounted terminal device and the location information of the other vehicle-mounted terminal device included in the notification information, and stops the pedestrian-vehicle communication in a case where the vehicle is located on the inside of the vehicle group.

According to this, in the vehicle-mounted terminal device of the vehicle located on the inside of the vehicle group, in order to stop the pedestrian-vehicle communication, it is possible to reduce the number of vehicle-mounted terminal devices which perform the pedestrian-vehicle communication. Accordingly, even in a situation in which multiple vehicles are gathering, it possible to sufficiently suppress the pedestrian-vehicle communication, and to reduce communication congestion due to an increase in traffic in the pedestrian-vehicle communication.

According to a ninth disclosure, there is provided a pedestrian-to-vehicle communication control device which controls pedestrian-vehicle communication performed between a vehicle-mounted terminal device mounted on a vehicle and a pedestrian terminal device carried by a pedestrian, the pedestrian-to-vehicle communication control device including: a communicator which communicates with each of a plurality of the pedestrian terminal devices; and a controller which controls pedestrian-vehicle communication in each of the plurality of the pedestrian terminal devices; in which the communicator receives location information transmitted from each of the plurality of the pedestrian terminal devices, and in which the controller determines whether or not a pedestrian who carries each of the plurality of the pedestrian terminal devices is located on the inside of the pedestrian group based on the location information of each of the plurality of the pedestrian terminal devices, and instructs the pedestrian terminal device to stop the pedestrian-vehicle communication in a case where the pedestrian is located on the inside of the pedestrian group.

According to this, similar to the first disclosure, even in a crowded situation in which multiple pedestrians and vehicles gather, it possible to sufficiently suppress the pedestrian-vehicle communication between the pedestrian terminal device and the vehicle-mounted terminal device, and to reduce communication congestion due to an increase in traffic in the pedestrian-vehicle communication.

According to a tenth disclosure, there is provided a pedestrian-to-vehicle communication system which includes a vehicle-mounted terminal device mounted on a vehicle and a pedestrian terminal device carried by a pedestrian, and which performs pedestrian-vehicle communication between the vehicle-mounted terminal device and the pedestrian terminal device, in which the pedestrian terminal device includes a location information acquirer which acquires location information of a pedestrian terminal device, a pedestrian-vehicle communicator which transmits and receives notification information to and from the vehicle-mounted terminal device by the pedestrian-vehicle communication, and a controller for controlling the pedestrian-vehicle communicator, in which the pedestrian-vehicle communicator receives notification information transmitted from another pedestrian terminal device that exists in the vicinity of the pedestrian terminal device, and in which the controller determines whether or not a pedestrian who carries the pedestrian terminal device is located on the inside of the pedestrian group based on the location information of the pedestrian terminal device and the location information of the other pedestrian terminal device included in the notification information, and stops the pedestrian-vehicle communication in a case where the pedestrian is located on the inside of the pedestrian group.

According to this, similar to the first disclosure, even in a crowded situation in which multiple pedestrians and vehicles gather, it possible to sufficiently suppress the pedestrian-vehicle communication between the pedestrian terminal device and the vehicle-mounted terminal device, and to reduce communication congestion due to an increase in traffic in the pedestrian-vehicle communication.

According to an eleventh disclosure, there is provided a pedestrian-to-vehicle communication method for performing pedestrian-vehicle communication between a vehicle-mounted terminal device mounted on a vehicle and a pedestrian terminal device carried by a pedestrian, the method including: by the pedestrian terminal device, acquiring location information of the pedestrian terminal device; receiving location information transmitted from another pedestrian terminal device that exists in the vicinity of the pedestrian terminal device; and determining whether or not a pedestrian who carries the pedestrian terminal device is located on the inside of the pedestrian group based on the location information of the pedestrian terminal device and the location information of the other pedestrian terminal device and, in a case where the pedestrian is located on the inside of the pedestrian group, stopping the pedestrian-vehicle communication.

According to this, similar to the first disclosure, even in a crowded situation in which multiple pedestrians and vehicles gather, it possible to sufficiently suppress the pedestrian-vehicle communication between the pedestrian terminal device and the vehicle-mounted terminal device, and to reduce communication congestion due to an increase in traffic in the pedestrian-vehicle communication.

Hereinafter, embodiments of the present disclosure will be described with reference to the drawings.

First Embodiment

FIG. 1 is an overall configuration view of a pedestrian-to-vehicle communication system according to a first embodiment.

The pedestrian-to-vehicle communication system includes pedestrian terminal device (PT) 1 and portable information terminal device (IT) 2 which are carried by a pedestrian, and vehicle-mounted terminal device (VT) 3 and car navigation device (CN) 4 which are mounted on a vehicle.

Pedestrian terminal device 1 has a positioning function of acquiring location information of the pedestrian terminal device and a communication function of performing pedestrian-vehicle communication with vehicle-mounted terminal device 3, and based on the location, traveling direction, the moving speed, and the like of the pedestrian and the vehicle, which are acquired by the functions, risk determination for determining whether or not the possibility of a vehicle colliding with the pedestrian who carries the pedestrian terminal device is high, is performed.

Portable information terminal device 2 is a smartphone, a mobile phone, a tablet terminal, a wearable terminal, or the like. When pedestrian terminal device 1 and portable information terminal device 2 are connected to each other and it is determined that there is a high possibility of collision in pedestrian terminal device 1, an output operation of attracting attention of a pedestrian for avoiding an accident (for example, voice output or vibration) is performed with respect to portable information terminal device 2. In addition, pedestrian terminal device 1 itself may perform the output operation of attracting attention.

Vehicle-mounted terminal device 3 has a positioning function of acquiring location information of the pedestrian terminal device and a communication function of performing pedestrian-vehicle communication with pedestrian terminal device 1, and based on the location, traveling direction, the moving speed, and the like of the pedestrian and the vehicle, which are acquired by the functions, risk determination for determining whether or not the possibility of a vehicle on which the pedestrian terminal device is mounted colliding with the pedestrian is high, is performed.

Car navigation device 4 performs route guidance with respect to the driver. When vehicle-mounted terminal device 3 and car navigation device 4 are connected to each other and it is determined that there is a high possibility of collision in vehicle-mounted terminal device 3, an output operation of attracting attention of a pedestrian for avoiding an accident (for example, voice output or vibration) is performed with respect to car navigation device 4. In addition, vehicle-mounted terminal device 3 itself may perform the output operation of attracting attention.

In addition, vehicle-mounted terminal device 3 may be connected to portable information terminal device 2 carried by the driver so as to cause portable information terminal device 2 to perform an output operation, such as attracting attention of the driver.

In addition, pedestrian terminal device 1 may be embedded in portable information terminal device 2, and vehicle-mounted terminal device 3 may be embedded in car navigation device 4.

In the pedestrian-to-vehicle communication system, information, such as the location, the traveling direction, the moving speed, and the like of pedestrians and vehicles necessary for risk determination are mutually exchanged between pedestrian terminal device 1 and vehicle-mounted terminal device 3, and the exchange of the information is performed by pedestrian-vehicle communication which uses a frequency band (for example, 700 MHz band and 5.8 GHz band) adopted in a safe driving support wireless system using an intelligent transport system (ITS).

In the pedestrian-vehicle communication, notification information is transmitted and received between pedestrian terminal device 1 and vehicle-mounted terminal device 3. The notification information (vehicle information) transmitted from pedestrian terminal device 1 includes identification information (terminal ID, MAC address, or the like) of pedestrian terminal device 1 in addition to the location information of the vehicle. The notification information (pedestrian information) transmitted from vehicle-mounted terminal device 3 includes identification information (terminal ID, MAC address, or the like) of vehicle-mounted terminal device 3 in addition to the location information of the pedestrian. In addition, the notification information (pedestrian information) transmitted from pedestrian terminal device 1 also includes information related to the traveling direction or the moving speed of the pedestrian acquired by a sensor (not illustrated) provided in pedestrian terminal device 1 or portable information terminal device 2. The notification information (vehicle information) transmitted from vehicle-mounted terminal device 3 also includes information related to the traveling direction or the moving speed of the vehicle acquired by a sensor (not illustrated) provided in vehicle-mounted terminal device 3 or car navigation device 4.

In addition, pedestrian terminal device 1 has a near field communication function, and it is possible to transmit and receive the notification information between pedestrian terminal devices 1 by the near field communication. In the near field communication, lower power than that of the pedestrian-vehicle communication, such as Bluetooth (registered trademark), specified low power wireless using the 920 MHz band, wireless LAN, such as Wi-Fi (registered trademark), that is, wireless communication with a small transmission output (for example, 10 mW or less) is performed.

Figure 2:
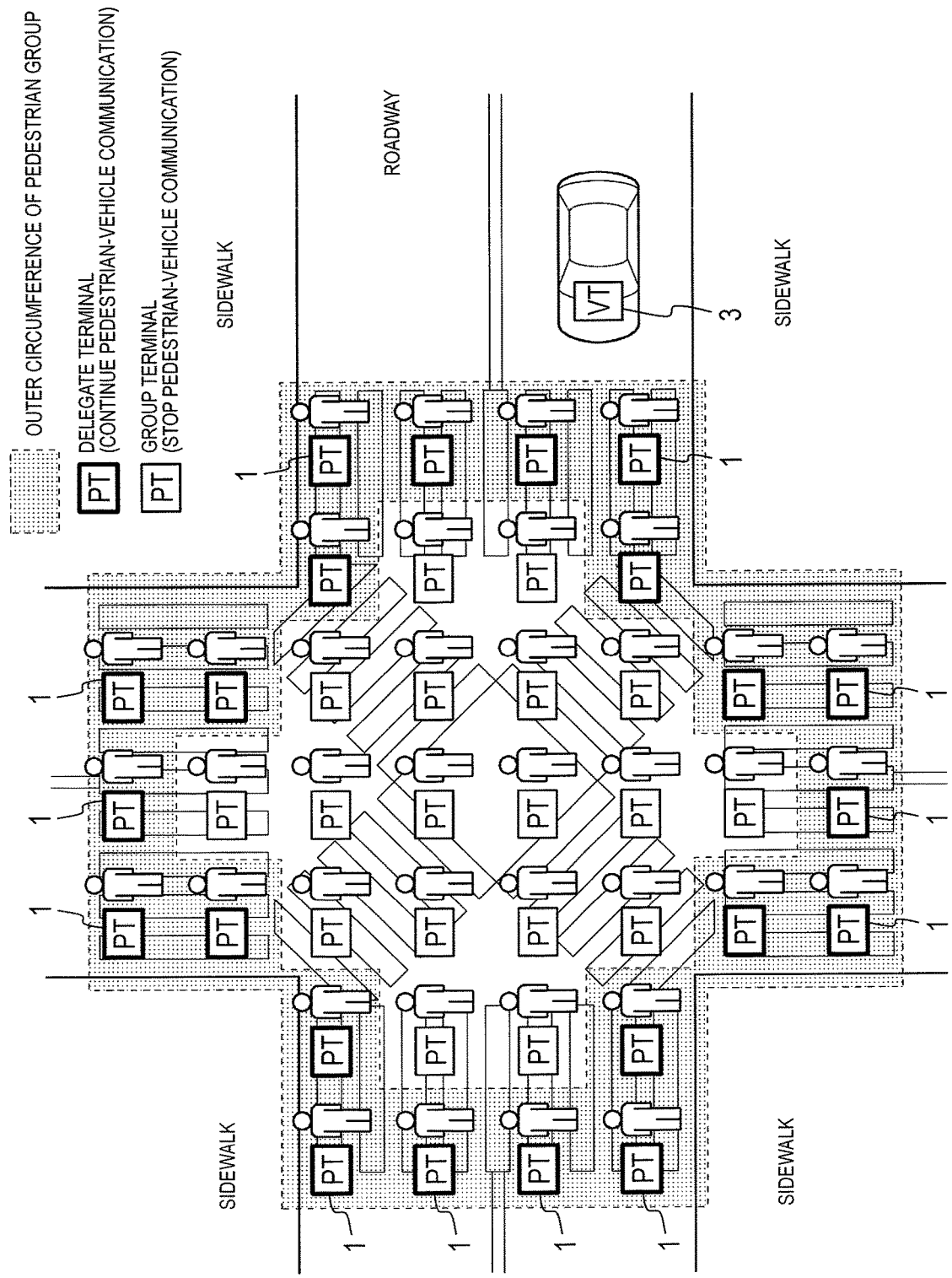
FIG. 2 is an explanatory view illustrating an example of a situation in which pedestrian-vehicle communication is stopped in pedestrian terminal device 1.

Next, a situation in which the pedestrian-vehicle communication is stopped in pedestrian terminal device 1 will be described. FIG. 2 is an explanatory view illustrating an example of a situation in which the pedestrian-vehicle communication is stopped in pedestrian terminal device 1.

In the pedestrian-to-vehicle communication system, a danger area is set in advance at a place where an accident is highly likely to occur, such as an intersection, and in a case where a pedestrian enters the danger area, it is notified that a pedestrian exists in the danger area to vehicle-mounted terminal device 3 by the pedestrian-vehicle communication. Specifically, in pedestrian terminal device 1, when detecting that a pedestrian has entered the danger area, the pedestrian information including the location information of the pedestrian is transmitted to vehicle-mounted terminal device 3. In addition, in vehicle-mounted terminal device 3, when receiving the pedestrian information transmitted from pedestrian terminal device 1, based on the pedestrian information, a risk determination related to whether or not the possibility that the host vehicle collides with the pedestrian is high is performed, and attention attracting with respect to the driver of the vehicle is performed in accordance with the determination result of the danger determination.

Here, in the situation in which there are many pedestrians and vehicles similar to intersections of downtown areas and roadways around event sites, such as fireworks festivals, as the number of pedestrian terminal devices 1 and vehicle-mounted terminal devices 3 increases, the traffic of pedestrian-vehicle communication increases. At this time, when the number of pedestrian terminal devices 1 and vehicle-mounted terminal devices 3 which perform the pedestrian-vehicle communication exceeds the limit of pedestrian-vehicle communication (for example, 300 units), congestion of the pedestrian-vehicle communication occurs.

The example illustrated in FIG. 2 illustrates the situation of the intersection (scramble intersection) of the downtown area. At such an intersection, when multiple pedestrians waiting for a signal begin to cross the pedestrian crossing located on the roadway which is a danger area, transmission of pedestrian information by the pedestrian-vehicle communication is started all at once by pedestrian terminal device 1 carried by each of the pedestrians. At this time, when the number of pedestrian terminal devices 1 which perform the pedestrian-vehicle communication exceeds the limit of pedestrian-vehicle communication, congestion of the pedestrian-vehicle communication occurs.

Here, in the embodiment, in the pedestrian group configured with multiple pedestrians in a congestion state where multiple pedestrians gathered, communication control for stopping the pedestrian-vehicle communication of pedestrian terminal device 1 of other pedestrians except for some pedestrians, is executed. In particular, in the present embodiment, since the pedestrian located on the inside of the pedestrian group has a low possibility of coming into contact with the vehicle, the pedestrian-vehicle communication is stopped in pedestrian terminal device 1 of the pedestrian. Meanwhile, since the pedestrian located at an outer circumference of the pedestrian group has a high possibility of coming into contact with the vehicle, the pedestrian-vehicle communication continues in pedestrian terminal device 1 of the pedestrian. Accordingly, it is possible to ensure safety of the pedestrian, and to suppress the pedestrian-vehicle communication.

Figure 3:
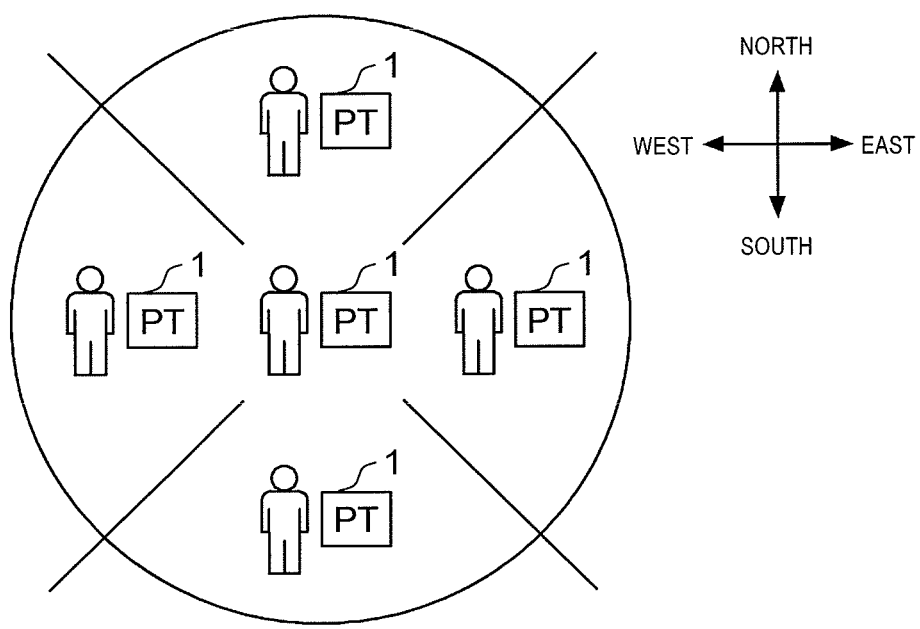
FIG. 3 is an explanatory view for explaining an enclosure status of a pedestrian.

Next, the enclosure status of a pedestrian will be described. FIG. 3 is an explanatory view for explaining the enclosure status of a pedestrian.

In pedestrian terminal device 1, the pedestrian-vehicle communication is stopped in a case where a pedestrian who carries the pedestrian terminal device is located on the inside of the pedestrian group, and the communication control for continuing the pedestrian-vehicle communication is executed in a case where the pedestrian who carries the pedestrian terminal device is located at an outer circumference of the pedestrian group.

At this time, based on the location information of the pedestrian terminal device and another pedestrian terminal device 1, it is determined whether or not the pedestrian who carries the pedestrian terminal device is in the enclosure status of being surrounded by other pedestrians in the vicinity, and in a case where the pedestrian is in the enclosure status, it is determined that the pedestrian who carries the pedestrian terminal device is located on the inside of the pedestrian group, and in a case where the pedestrian is not in the enclosure status, it is determined that the pedestrian who carries the pedestrian terminal device is located at the outer circumference of the pedestrian group.

Specifically, in a predetermined range (for example, a radius of 1 m) centering on the pedestrian who carries the pedestrian terminal device, it is determined that the pedestrian is in the enclosure status in a case where another pedestrian exists around the pedestrian who carries the pedestrian terminal device, that is, in all of each direction of east, west, south, and north. In this case, for example, a circular area centered on the pedestrian who carries the pedestrian terminal device is divided into four divided areas of east, west, south and north, and whether or not another pedestrian exists in all of the divided areas may be determined.

In a case where there are other pedestrians in every direction of the pedestrian who carries the pedestrian terminal device, that is, in each of the directions of the east, west, south, and north and in all of the northeast, northwest, southeast, and southwest directions, it may be determined that the pedestrian is in the enclosure status.

Here, it is always possible to determine whether or not the pedestrian is in the enclosure status, but in a situation in which the possibility of occurrence of congestion in pedestrian-vehicle communication is low, the processing is useless. In addition, in the present embodiment, prior to the determination of the enclosure status, a congestion state about whether or not a situation in which the possibility of occurrence of the congestion of the pedestrian-vehicle communication is high, that is, a situation of being congested by the pedestrians or the vehicles is achieved, is determined. In the determination of the congestion state, it is determined whether or not pedestrian terminal devices 1 and vehicle-mounted terminal devices 3 of which the number exceeds the limit of pedestrian-vehicle communication exist in the vicinity of the pedestrian terminal device.

In addition, an area where congestion is expected may be set in advance as a target area, and when the pedestrian terminal device enters the target area, the determination about the enclosure status may be performed.

Figure 4:
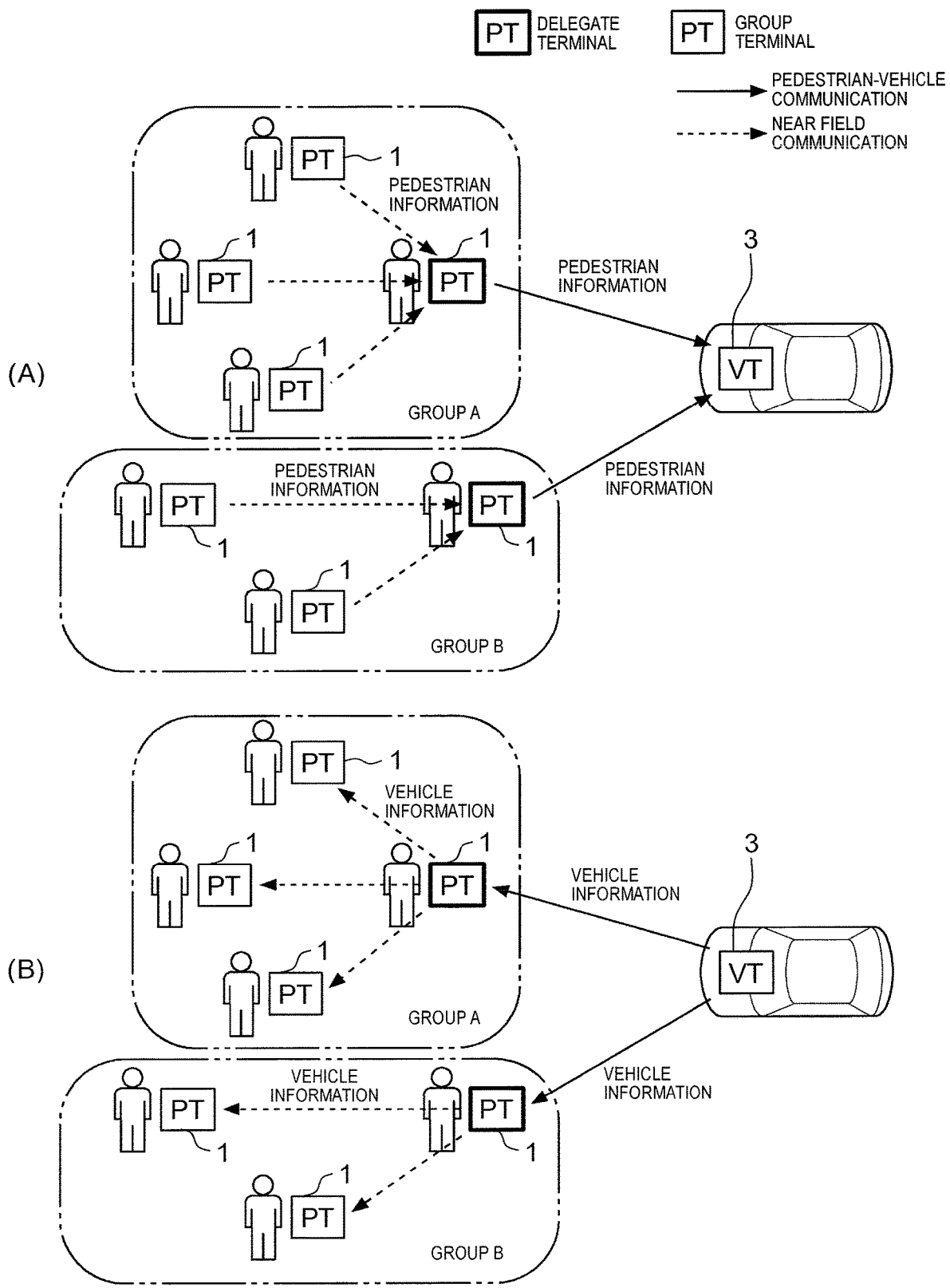
FIG. 4 is an explanatory view illustrating a communication situation in the pedestrian-to-vehicle communication system.

Next, a communication situation in the pedestrian-to-vehicle communication system will be described. FIG. 4 is an explanatory view illustrating a communication situation in the pedestrian-to-vehicle communication system.

In the pedestrian-to-vehicle communication system, pedestrian terminal device 1 which is in a normal mode exchanges the notification information (pedestrian information and vehicle information) with vehicle-mounted terminal device 3 by pedestrian-vehicle communication at the normal time.

Meanwhile, in the congestion state, pedestrian terminal device 1 of the pedestrian located at the outer circumference of the pedestrian group becomes a delegate terminal of pedestrian terminal device 1 of the pedestrian located on the inside of the pedestrian group around the pedestrian terminal device, and the pedestrian-vehicle communication continues. In addition, pedestrian terminal device 1 of the pedestrian located on the inside of the pedestrian group becomes a group terminal that belongs to a group in which pedestrian terminal device 1 that became the delegate terminal is a common delegate terminal, and the pedestrian-vehicle communication is stopped. In addition, a substitute communication state where exchange of the notification information (pedestrian information and vehicle information) between pedestrian terminal device 1 and vehicle-mounted terminal device 3 which became the group terminal is substitutingly performed by pedestrian terminal device 1 which became the delegate terminal, is achieved.

In a case where pedestrian terminal device 1 of the pedestrian located at the outer circumference has a small battery level, or the like, pedestrian terminal device 1 next close to the outer circumference may be the delegate terminal.

In the substitute communication state, the notification information is mutually exchanged by the pedestrian-vehicle communication with vehicle-mounted terminal device 3 in pedestrian terminal device 1 that became the delegate terminal, and in pedestrian terminal device 1 which became the group terminal, the notification information is mutually exchanged by near field communication with pedestrian terminal device 1 which became the delegate terminal.

At this time, as illustrated in (A) in FIG. 4, in pedestrian terminal device 1 which became the delegate terminal, the pedestrian information is acquired from pedestrian terminal device 1 which became the group terminal by the near field communication, and the pedestrian information is provided to vehicle-mounted terminal device 3 by the pedestrian-vehicle communication together with the pedestrian information of the device itself. In addition, as illustrated in (B) in FIG. 4, in pedestrian terminal device 1 that became the delegate terminal, the vehicle information is acquired from vehicle-mounted terminal device 3 by the pedestrian-vehicle communication, and the vehicle information is provided to pedestrian terminal device 1 which became the group terminal by the near field communication.

Next, another example of the situation in which the pedestrian-vehicle communication is stopped in pedestrian terminal device 1 will be described.

Figure 5:
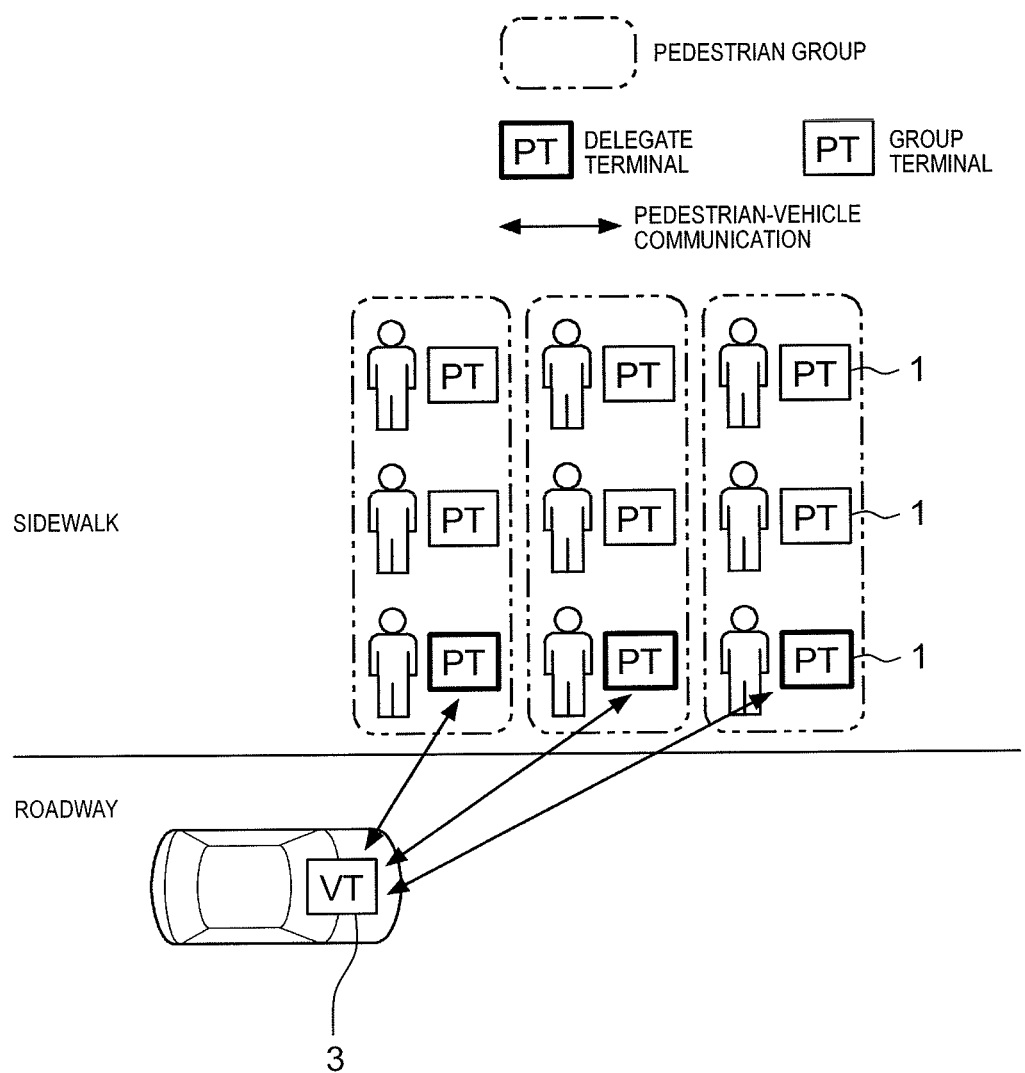
FIG. 5 is an explanatory view illustrating another example of the situation in which the pedestrian-vehicle communication is stopped in pedestrian terminal device 1.
Figure 6:
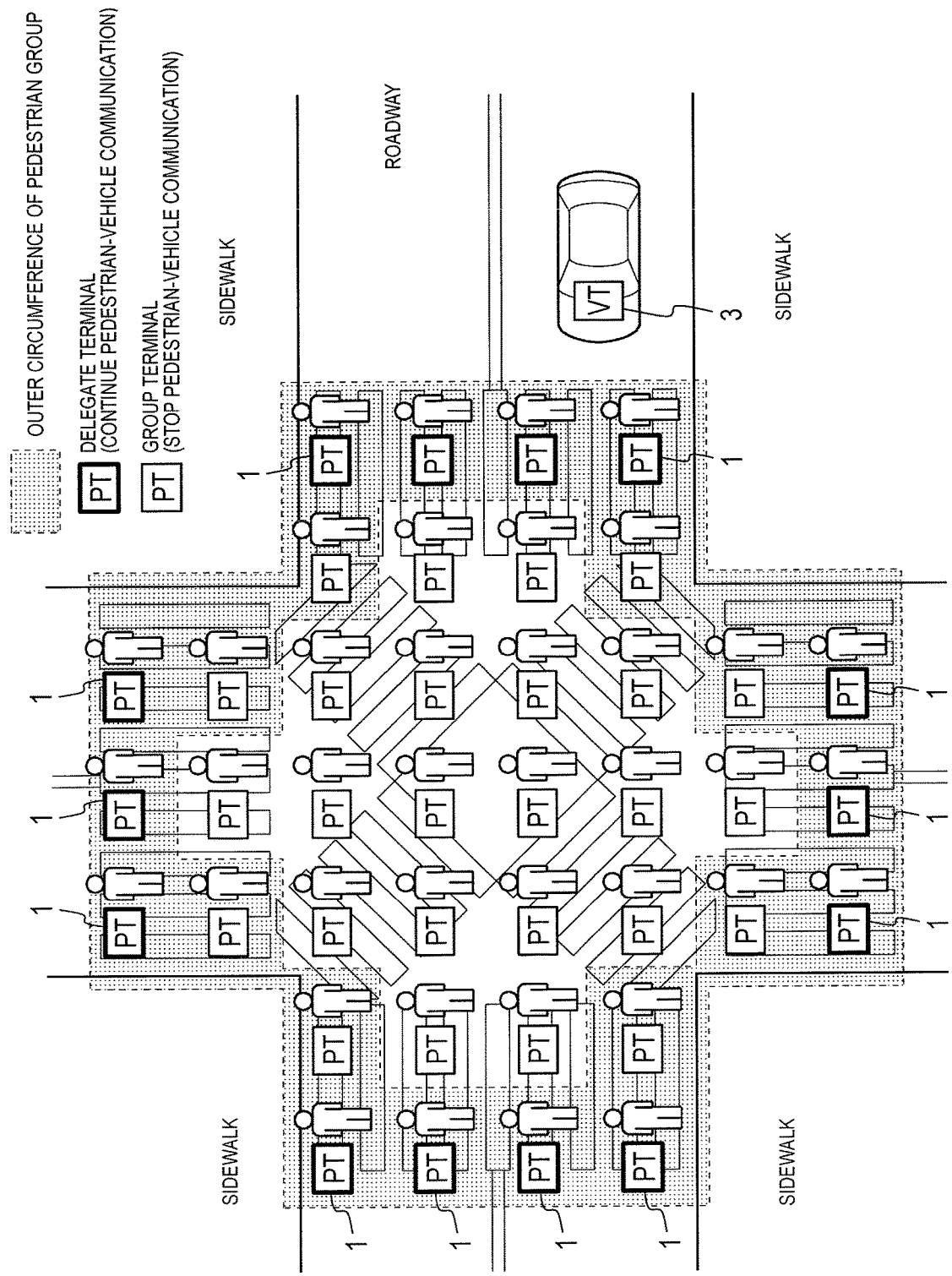
FIG. 6 is an explanatory view illustrating still another example of the situation in which the pedestrian-vehicle communication is stopped in pedestrian terminal device 1.
Figure 7:
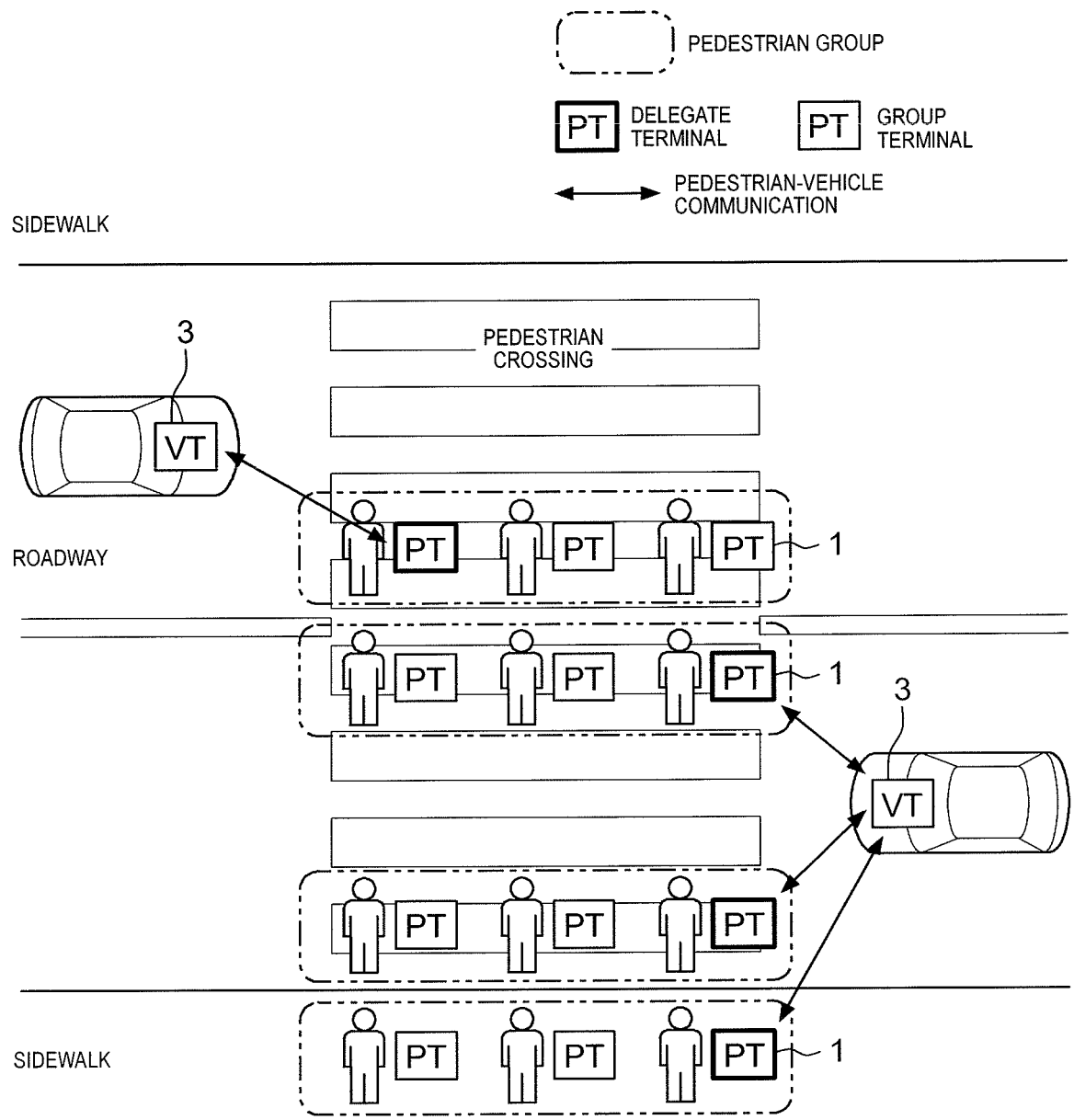
FIG. 7 is an explanatory view illustrating still another example of the situation in which the pedestrian-vehicle communication is stopped in pedestrian terminal device 1.

FIGS. 5, 6, and 7 are explanatory views illustrating another example of the situation in which pedestrian-vehicle communication is stopped in pedestrian terminal device 1.

In the example illustrated in FIG. 5, there are a plurality of pedestrians on a sidewalk along a roadway which is a high-risk area. A pedestrian on the sidewalk opposite the roadway which is the farthest from the roadway is located at the outer circumference of the pedestrian group, but is not located close to the roadway, and another pedestrian on the roadway side of the pedestrian exists. In such cases, since the pedestrians on the side opposite to the roadway have a low possibility of collision with a vehicle, there will be no problem even when the pedestrian-vehicle communication by pedestrian terminal device 1 of the pedestrian is stopped.

Here, in the present embodiment, even in a case where a pedestrian who is considered as a determination target is located at the outer circumference of the pedestrian group, in a case where the pedestrian is not at a location close to the high-risk area, the pedestrian-vehicle communication is stopped considering pedestrian terminal device 1 of the pedestrian as the group terminal.

In addition, in the example illustrated in FIG. 5, a case where the pedestrian group is located on a sidewalk is illustrated. However, even on a roadway having no sidewalk, similarly, regarding a pedestrian who is not at the location close to the high-risk area, that is, who is on an end side of the roadway separated from the high-risk area, even in a case where the pedestrian is located at the outer circumference of the pedestrian group, the pedestrian-vehicle communication may be stopped considering pedestrian terminal device 1 of the pedestrian as the group terminal.

The example illustrated in FIG. 6 is a case of the pedestrian who crosses a crosswalk at an intersection, similar to the example illustrated in FIG. 2. In this case, since the vehicle exists only in the area of the roadway excluding the crosswalk at the intersection, the area of the roadway excluding the crosswalk at the intersection becomes a high-risk area, and regarding a pedestrian who is not close to this area, even when the pedestrian is located at the outer circumference of the pedestrian group, the pedestrian-vehicle communication is stopped considering pedestrian terminal device 1 as the group terminal. In the example illustrated in FIG. 6, among the 22 pedestrians located at the outer circumference of the pedestrian group, pedestrian terminal devices 1 of 14 pedestrians who face the area of the roadway excluding the pedestrian crossing continue the pedestrian-vehicle communication as the delegate terminals, and pedestrian terminal devices 1 of 8 pedestrians who are not facing the area of the roadway excluding the pedestrian crossing stop the pedestrian-vehicle communication as group terminals.

In this manner, in order to stop the pedestrian-vehicle communication in the pedestrian terminal device 1 of a pedestrian who is not at a location close to a high-risk area, information related on the high-risk area is set in the map information in advance. Based on the map information and the location information of the pedestrian, it is determined whether or not the pedestrian who is the determination target is at a location close to the high-risk area, and in a case where the pedestrian is not at the location close to the high-risk area, the pedestrian-vehicle communication may be stopped considering pedestrian terminal device 1 of the pedestrian as the group terminal.

In addition, in a case where there is another pedestrian between the pedestrian who is the determination target and the high-risk area, the pedestrian-vehicle communication may be stopped as the group terminal. In this case, based on the map information and the location information of the pedestrian, it is determined whether or not another pedestrian between the pedestrian which is a determination target and the high-risk area, and in a case where another pedestrian exists between the pedestrian who is the determination target and the high-risk area, the pedestrian-vehicle communication may be stopped considering pedestrian terminal device 1 of the pedestrian as the group terminal.

However, in pedestrian terminal device 1 that became the delegate terminal, the vehicle information is received from vehicle-mounted terminal device 3 by the pedestrian-vehicle communication, and the vehicle information is transmitted to pedestrian terminal device 1 which became the group terminal by the near field communication. Therefore, pedestrian terminal device 1 in the same group performs risk determination based on the same vehicle information. Therefore, when the pedestrian terminal devices with different risk situations are considered as the same group, it is not possible to appropriately attract attention based on the risk determination.

Here, in the present embodiment, one group configured of pedestrian terminal device 1 that became the delegate terminal and pedestrian terminal device 1 that became the group terminal considering this pedestrian terminal device 1 as the common delegate terminal is a group of which the risk situation is similar, that is, a group which is configured of only pedestrian terminal device 1 of the pedestrian which can similarly perform the determination about the possibility of collision with the vehicle, and pedestrian terminal devices 1 of the pedestrian of which risk situations are different from each other, is considered as another group.

In the example illustrated in FIG. 7, a pedestrian crosses a pedestrian crossing provided on a roadway of one lane on one side. In this case, there is a high possibility that a pedestrian located in one lane collides with a vehicle which travels in the one lane, there is a high possibility that a pedestrian located in the other lane collides with a vehicle which travels in the other lane, and the risk situation differs in accordance with the lane in which the pedestrian is located. Here, pedestrians located in the same lane are grouped in the same group, and pedestrians located in the opposite lane are grouped into different groups.

In addition, there is a case where the risk situation differs between a pedestrian who crosses a pedestrian crossing and a pedestrian who walks on a sidewalk. Here, in the present embodiment, pedestrians located on the roadway and pedestrians located on the sidewalk are grouped so as to be in a different group.

In the example illustrated in FIG. 7, pedestrian terminal device 1 of the pedestrian located on the side to which the vehicle comes in the pedestrian group becomes the delegate terminal, and pedestrian terminal device 1 of the pedestrian who is not located on the side to which the vehicle comes becomes the group terminal. In addition, 6 pedestrian groups which exist so as to be on two lanes are grouped into two groups of three people for each lane, and 6 pedestrian groups which exist so as to be on the roadway and the sidewalk are grouped into two groups of three people each on the roadway and the sidewalk. In addition, although 6 pedestrians are located on the same lane, the pedestrians are divided into two pedestrian groups, and thus, the pedestrians are grouped into different groups. In addition, the pedestrians located on the same lane may be grouped into one group.

In this manner, in order to perform grouping so that pedestrians having similar risk situations configure one group, the determination area may be divided in accordance with the similarity of the risk situation, that is, one determination area may be set in a range in which the risk situations are similar. In the example illustrated in FIG. 7, one lane is considered as one determination area. In addition, on the roadways with two or more lanes on one side, lanes in the same direction may be considered together as one determination area.

In addition, the information in the determination area is set in the map information in advance, and pedestrian terminal devices 1 of the pedestrians located in the same determination area are set to the same group based on the map information and the location information of the pedestrian. In other words, grouping is performed so that pedestrian terminal device 1 which becomes the delegate terminal and pedestrian terminal device 1 which becomes the group terminal considering pedestrian terminal device 1 as a common delegate terminal configure one group.

In addition, in a vehicle intrusion prohibited area (pedestrian only area) where a vehicle cannot temporarily or regularly enter similar to a roadway that became a so-called pedestrian's paradise, there is a low possibility that a vehicle collides with a pedestrian, and thus, the pedestrian-vehicle communication by all of the pedestrian terminal devices 1 may be stopped. In addition, in an area which is close to the roadway, but into which the vehicle cannot enter, such as a pedestrian bridge and a pedestrian deck, there is a low possibility that a vehicle collides with a pedestrian, and thus, the pedestrian-vehicle communication by all of pedestrian terminal devices 1 may be stopped.

Figure 8:
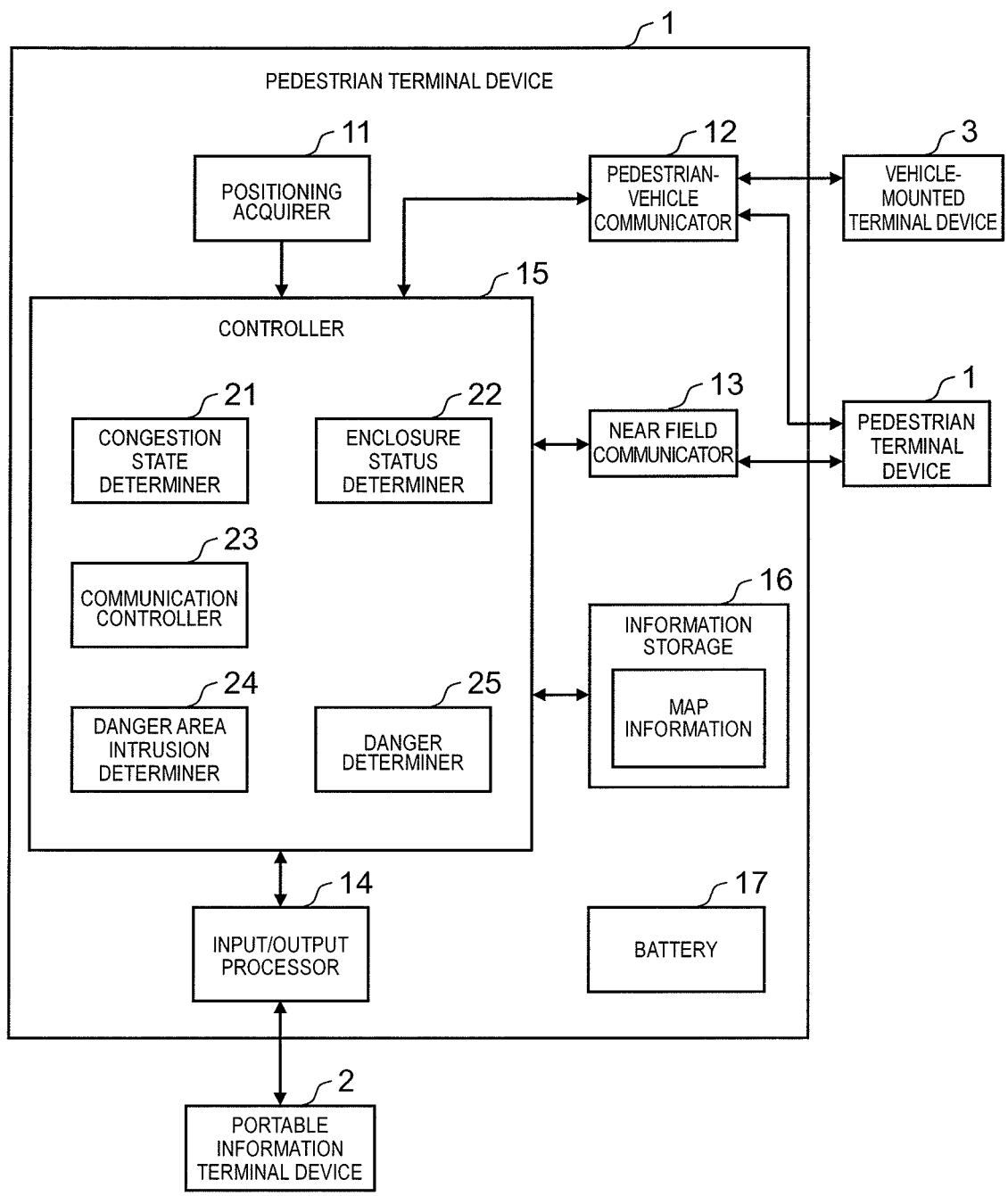
FIG. 8 is a block diagram illustrating a schematic configuration of pedestrian terminal device 1.

Next, a schematic configuration of pedestrian terminal device 1 will be described. FIG. 8 is a block diagram illustrating a schematic configuration of pedestrian terminal device 1.

The pedestrian terminal device includes positioning acquirer (location information acquirer) 11, pedestrian-vehicle communicator 12, near field communicator 13, input/output processor 14, controller 15, information storage 16, and battery 17.

Positioning acquirer 11 acquires the location information of the pedestrian terminal device by a satellite positioning system, such as a global positioning system (GPS), a quasi-zenith satellite system (QZSS), or a global navigation satellite system (GLONASS). In addition, the location information of the pedestrian terminal device may be acquired using the positioning function of portable information terminal device 2.

Pedestrian-vehicle communicator 12 performs the pedestrian-vehicle communication with vehicle-mounted terminal device 3. In the pedestrian-vehicle communication, wireless communication is performed using the frequency band adopted in the safe driving support wireless system using the ITS.

Near field communicator 13 performs near field communication (low power communication) with another pedestrian terminal device 1. In the near field communication, lower power than that of the pedestrian-vehicle communication, such as Bluetooth (registered trademark), specified low power wireless using the 920 MHz band, wireless LAN, such as Wi-Fi (registered trademark), that is, wireless communication with a small transmission output (for example, 10 mW or less) is performed.

Input/output processor 14 performs input and output of information with the portable information terminal device 2. Based on the information output from the input/output processor 14, an output operation for attracting attention of a pedestrian or the like is performed in portable information terminal device 2.

Battery 17 supplies electric power to each part of pedestrian terminal device 1.

Information storage 16 stores map information or programs executed by controller 15. The map information is automatically updated in accordance with the operation of the user and at a predetermined timing. The update information of the map information may be downloaded from the server using the communication function of portable information terminal device 2, in addition to using an appropriate storage medium. In addition, the map information may be acquired from portable information terminal device 2.

Controller 15 includes congestion state determiner 21, enclosure status determiner 22, communication controller 23, danger area intrusion determiner 24, and danger determiner 25. Controller 15 is configured with a processor, and each part of controller 15 is realized by causing the processor to execute the program stored in information storage 16.

In congestion state determiner 21, determination on the congestion state related to whether or not the periphery of the pedestrian terminal device is congested, is determined. In the present embodiment, pedestrian terminal device 1 which exists in the vicinity of the pedestrian terminal device is counted to acquire the number of peripheral terminals, and in a case where the number of peripheral terminals becomes equal to or greater than a predetermined first threshold value (for example, 300), the congestion state is determined. At this time, by considering pedestrian terminal device 1 which received the pedestrian information by the pedestrian-vehicle communication within a predetermined period, as a target, pedestrian terminal devices 1 may be counted based on the terminal identification information included in the received pedestrian information.

In addition, in the present embodiment, the number of peripheral terminals is acquired by counting the peripheral pedestrian terminal devices 1, but the number of peripheral terminals may include vehicle-mounted terminal device 3. In this case, the vehicle information transmitted from vehicle-mounted terminal device 3 may be received by pedestrian terminal device 1, and vehicle-mounted terminal device 3 may be counted based on this vehicle information.

In congestion state determiner 21, determination on the congestion state related to whether or not the periphery of the pedestrian terminal device is congested, is determined.

In the determination of releasing the congestion state, in a case where the number of peripheral terminals becomes equal to or less than a predetermined second threshold value (for example, 100), it is determined that the congestion state is released.

Here, when counting pedestrian terminal devices 1, pedestrian terminal device 1 which received the pedestrian information by the pedestrian-vehicle communication, that is, pedestrian terminal device 1 which became the delegate terminal that exists in the periphery is counted, and the number of delegate terminals is acquired. In addition, from each pedestrian terminal device 1 that became the delegate terminal, the number of group terminals under the delegate terminal is acquired. In addition, the number of peripheral terminals may be acquired by cumulating the number of delegate terminals and the number of group terminals under each of the delegate terminals.

In the present embodiment, the congestion state is determined based on the number of pedestrian terminal devices 1 (the number of peripheral terminals) that exist in the vicinity of the pedestrian terminal device, but a case where the communication state of the pedestrian-vehicle communication deteriorates, that is, a case where congestion occurs in pedestrian-vehicle communication, may be detected, and the congestion state may be determined based on the detection result.

In enclosure status determiner 22, based on the location information of the pedestrian terminal device and another pedestrian terminal device 1, it is determined whether or not the pedestrian who carries the pedestrian terminal device is in an enclosure status of being surrounded by other nearby pedestrians. The determination of the enclosure status is as illustrated in FIG. 3.

Communication controller 23 controls pedestrian-vehicle communicator 12 and near field communicator 13. In the present embodiment, three operation modes, such as a normal mode, a delegate terminal mode, and a group terminal mode are switched. In the normal mode, the information is transmitted and received to and from vehicle-mounted terminal device 3 by the pedestrian-vehicle communication. In the delegate terminal mode, as the delegate terminal of another pedestrian terminal device 1 which exists in the periphery of the pedestrian terminal device, the notification information is transmitted and received to and from vehicle-mounted terminal device 3 by the pedestrian-vehicle communication, and the notification information is transmitted and received to and from another pedestrian terminal device 1 which became the group terminal by the near field communication. In the group terminal mode, the notification information is transmitted and received by the near field communication with another pedestrian terminal device 1 that became the delegate terminal.

The switching of the operation mode is performed based on the determination results of congestion state determiner 21 and enclosure status determiner 22. In other words, when the congestion state is determined by congestion state determiner 21, and the enclosure status is determined by enclosure status determiner 22, the operation mode moves to the group terminal mode. When the congestion state is not determined, the normal mode remains, and when the enclosure status is determined even in the congestion state, the operation mode moves to the delegate terminal mode.

In communication controller 23, when moving to the group terminal mode, the operation of pedestrian-vehicle communicator 12 is stopped. Specifically, the power supply from battery 17 to pedestrian-vehicle communicator 12 is stopped.

In addition, when congestion state determiner 21 determines that the congestion state is released, communication controller 23 releases the delegate terminal mode and the group terminal mode, and returns to the normal mode.

Danger area intrusion determiner 24 determines whether or not the pedestrian has entered the danger area based on the location information of the pedestrian acquired by positioning acquirer 11 and the map information stored in information storage 16.

Danger determiner 25 determines whether or not it is necessary to attract attention, that is, whether or not the possibility of collision of the vehicle with the pedestrian is high, based on the location, the moving speed, the traveling direction, or the like of the pedestrian and the vehicle.

Figure 9:
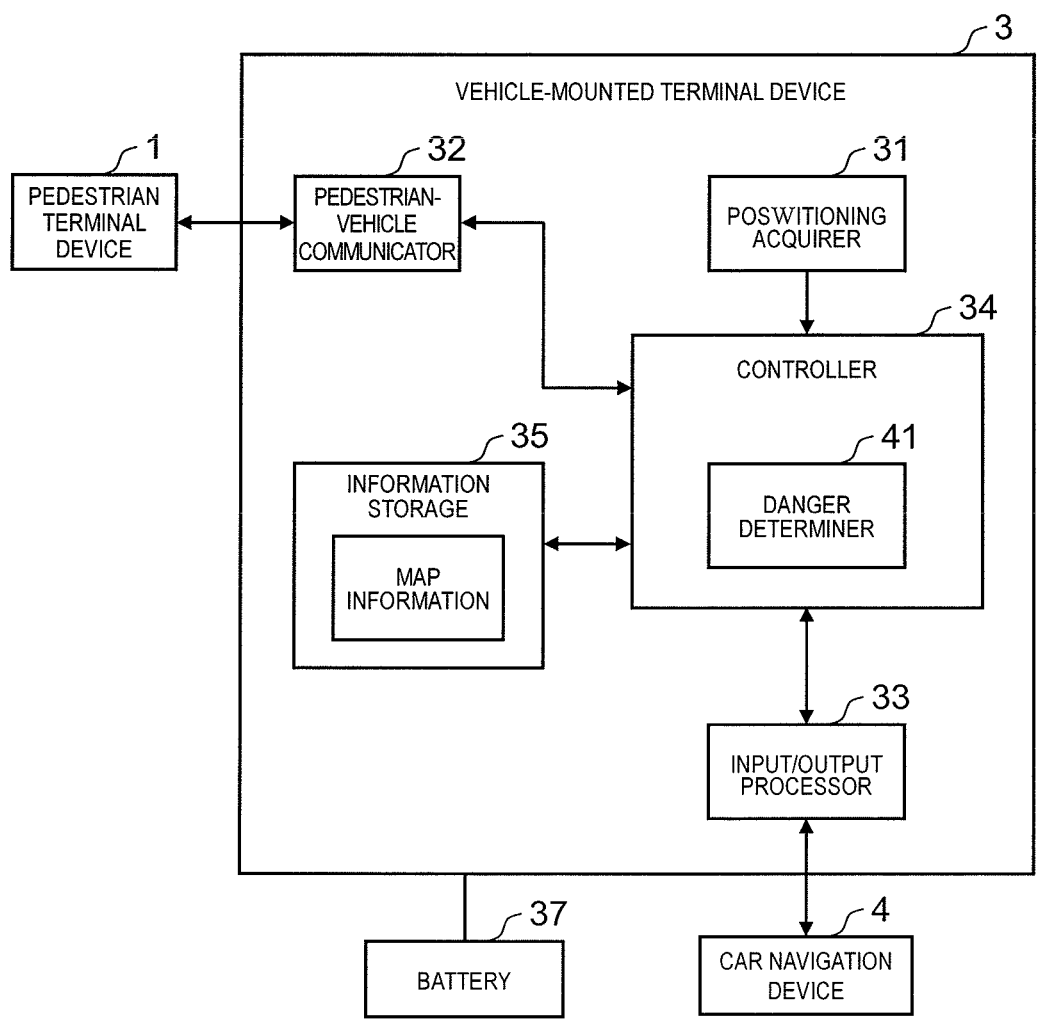
FIG. 9 is a block diagram illustrating a schematic configuration of vehicle-mounted terminal device 3.

Next, a schematic configuration of vehicle-mounted terminal device 3 will be described. FIG. 9 is a block diagram illustrating a schematic configuration of vehicle-mounted terminal device 3.

Vehicle-mounted terminal device 3 includes positioning acquirer (location information acquirer) 31, pedestrian-vehicle communicator 32, input/output processor 33, controller 34, and information storage 35. In addition, electric power is supplied to vehicle-mounted terminal device 3 from battery 37 mounted on the vehicle.

Positioning acquirer 31 acquires the location information of the pedestrian terminal device by the satellite positioning system similar to acquisition acquirer 11 of pedestrian terminal device 1. In addition, the location information of the pedestrian terminal device may be acquired using the positioning function of car navigation device 4.

Pedestrian-vehicle communicator 32 performs the pedestrian-vehicle communication with pedestrian terminal device 1. In the pedestrian-vehicle communication, similar to pedestrian-vehicle communicator 12 of pedestrian terminal device 1, wireless communication is performed using the frequency band adopted in the safe driving support wireless system using the ITS.

Input/output processor 33 performs input and output of information with car navigation device 4. Based on the information output from the input/output processor 33, an output operation for attracting attention of a pedestrian or the like is performed in car navigation device 4.

Information storage 35 stores map information or programs executed by controller 34. The map information is automatically updated in accordance with the operation of the user and at a predetermined timing. The update information of the map information may be downloaded from the server using the communication function of vehicle-mounted terminal device 3 or car navigation device 4, in addition to using an appropriate storage medium. In addition, the map information may be acquired from car navigation device 4.

Controller 34 includes a danger determiner 41. Controller 34 is configured with a processor, and danger determiner 41 is realized by causing the processor to execute the program stored in information storage 35. Danger determiner 41 determines whether or not it is necessary to attract attention, that is, whether or not the possibility of collision of the vehicle with the pedestrian is high, based on the location, the moving speed, the traveling direction, or the like of the pedestrian and the vehicle.

Figure 10:
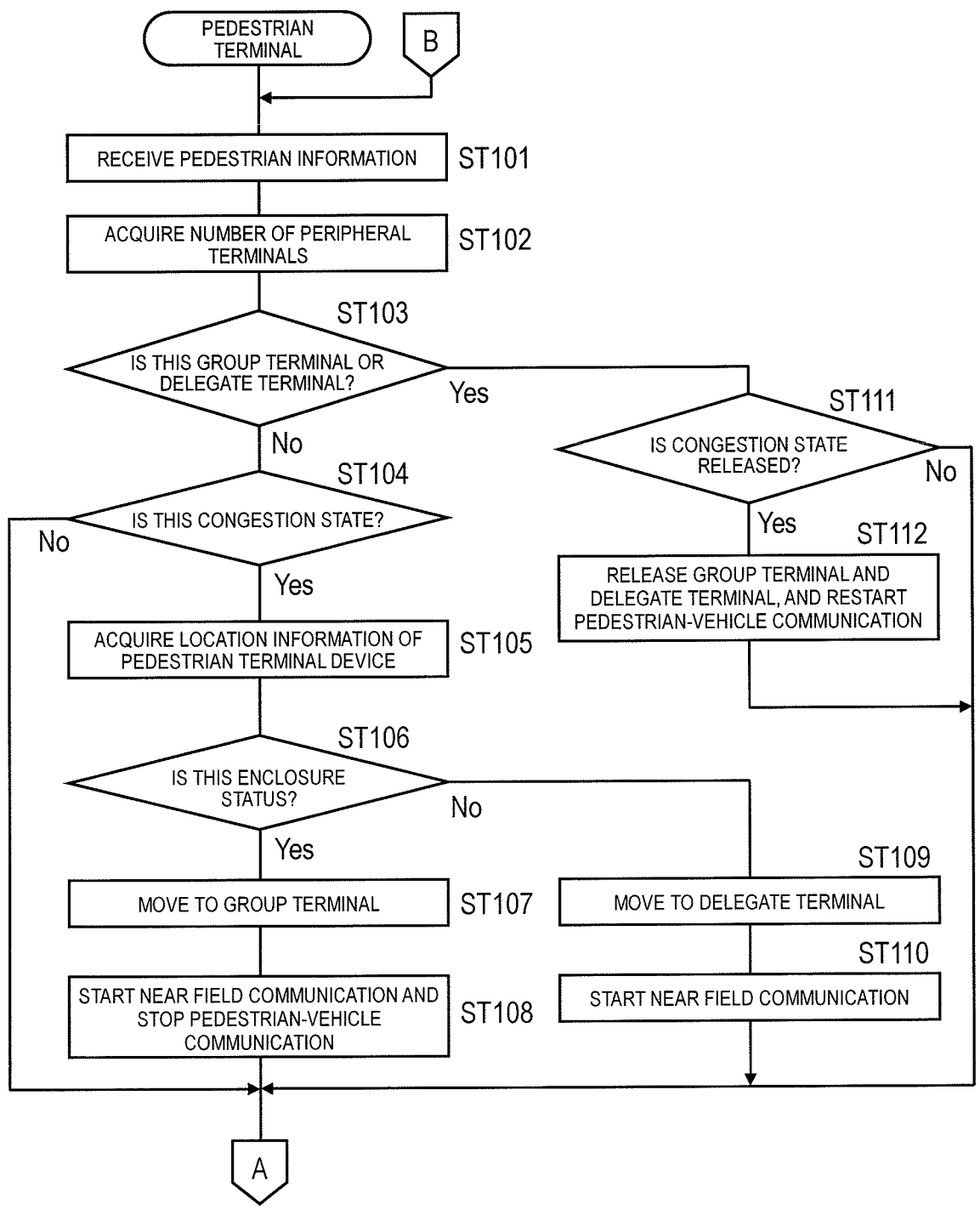
FIG. 10 is a flowchart illustrating a procedure of processing performed by pedestrian terminal device 1.
Figure 11:
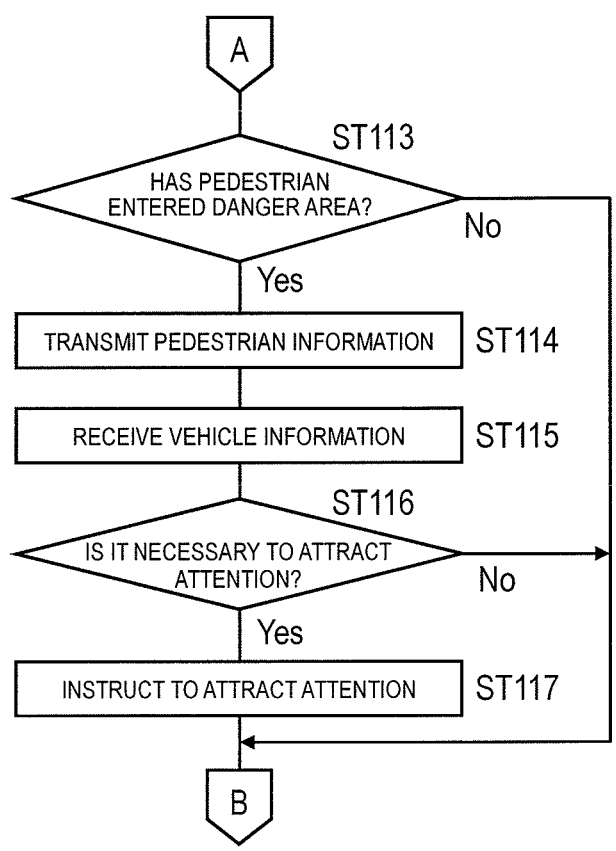
FIG. 11 is a flowchart illustrating a procedure of processing performed by pedestrian terminal device 1.

Next, a procedure of processing performed by pedestrian terminal device 1 will be described. FIGS. 10 and 11 are flowcharts illustrating a procedure of processing performed by pedestrian terminal device 1.

In pedestrian terminal device 1, first, pedestrian-vehicle communicator 12 receives the pedestrian information transmitted from peripheral pedestrian terminal device 1 by the pedestrian-vehicle communication (ST101). Next, in congestion state determiner 21, based on the pedestrian information received by pedestrian-vehicle communicator 12, pedestrian terminal devices 1 which exist around the pedestrian terminal device are counted and the number of peripheral terminals is acquired (ST102). In addition, it is determined whether or not the pedestrian terminal device has already moved to the group terminal or the delegate terminal (ST103).

Here, in a case where pedestrian terminal device 1 which is the target has not moved to the group terminal or the delegate terminal yet (NO in ST103), then, it is determined whether or not the periphery of the pedestrian terminal device is in the congestion state by comparing the number of peripheral terminals with the first threshold value (ST104).

Here, in a case where it is determined that the number of peripheral terminals is equal to or greater than the first threshold value and it is determined that the terminal is in a congestion state (YES in ST104), location information of the pedestrian terminal device is acquired in the positioning acquirer 11 (ST105). In addition, in enclosure status determiner 22, based on the location information of the pedestrian terminal device and another pedestrian terminal device 1, it is determined whether or not the pedestrian who carries the pedestrian terminal device is in an enclosure status of being surrounded by other nearby pedestrians (ST106).

Here, when it is determined that the terminal is in the enclosure status (YES in ST106), in communication controller 23, the operation mode moves to the group terminal mode (ST107). In addition, the operation of pedestrian-vehicle communicator 12 is stopped, and transmission and reception of the notification information is started with pedestrian terminal device 1 that became the delegate terminal in near field communicator 13 (ST108).

Next, as illustrated in FIG. 11, danger area intrusion determiner 24 determines whether or not the pedestrian has entered the danger area based on the location information of the pedestrian acquired by positioning acquirer 11 and the map information stored in information storage 16 (ST113).

Here, when the pedestrian has entered the danger area (YES in ST113), near field communicator 13 transmits the pedestrian information including the location information itself to another pedestrian terminal device 1 that became the delegate terminal by the near field communication (ST114). At this time, another pedestrian terminal device 1 that became the delegate terminal transmits the received pedestrian information and the pedestrian information itself to vehicle-mounted terminal device 3 by the pedestrian-vehicle communication, and also receives the vehicle information transmitted from vehicle-mounted terminal device 3 by the pedestrian-vehicle communication.

Then, in near field communicator 13, when receiving the vehicle information transmitted by the near field communication from another pedestrian terminal device 1 that became the delegate terminal (ST115), danger determiner 25 determines whether or not it is necessary to attract attention of the pedestrian (ST116).

Here, when it is determined that it is necessary to attract attention (YES in ST116), portable information terminal device 2 is instructed to attract attention (ST117). Accordingly, in portable information terminal device 2, an output operation for attracting attention of the pedestrian is performed.

In a case where the pedestrian has not entered the danger area (NO in ST113), there is no particular processing to be performed, and the transmission of the pedestrian information is stopped. In addition, in a case where it is determined that it is necessary to attract attention (NO in ST116), there is no particular processing to be performed.

Meanwhile, as illustrated in FIG. 10, in a case where it is determined that the state is not the enclosure status (NO in ST106), communication controller 23 moves to the delegate terminal mode (ST109). In addition, in near field communicator 13, transmission and reception of notification information by the near field communication to and from another pedestrian terminal device 1 which became the group terminal is started (ST110), and the process proceeds to the danger area intrusion determination (ST113) illustrated in FIG. 11.

At this time, in near field communicator 13, the pedestrian information transmitted by the near field communication is received from another pedestrian terminal device 1 which became the group terminal, and in pedestrian-vehicle communicator 12, the pedestrian information of another pedestrian terminal device 1 which became the group terminal and the pedestrian information itself are transmitted to vehicle-mounted terminal device 3 (ST114). In addition, in pedestrian-vehicle communicator 12, the vehicle information transmitted from vehicle-mounted terminal device 3 by the pedestrian-vehicle communication is received (ST115), and in near field communicator 13, the vehicle information of vehicle-mounted terminal device 3 is transmitted to another pedestrian terminal device 1 which became the group terminal by the near field communication.

Meanwhile, as illustrated in FIG. 10, in a case where it is determined that the vehicle is not in the congestion state (NO in ST104), there is no change in the operation mode, the normal mode is maintained, and the process proceeds to the danger area intrusion determination (ST113) illustrated in FIG. 11.

At this time, in pedestrian-vehicle communicator 12, the pedestrian information itself is transmitted to vehicle-mounted terminal device 3 by the pedestrian-vehicle communication (ST114), and the vehicle information transmitted from vehicle-mounted terminal device 3 by the pedestrian-vehicle communication is received (ST115).

In addition, as illustrated in FIG. 10, in a case where the pedestrian terminal device moved to the group terminal or the delegate terminal (YES in ST103), next, in congestion state determiner 21, it is determined whether or not the congestion state has been released by comparing the number of peripheral terminals with the second threshold value (ST111).

Here, in a case where the number of peripheral terminals becomes equal to or less than the second threshold value and it is determined that the congestion state has been released (YES in ST111), communication controller 23 releases the group terminal mode or the delegate terminal mode, returns to the normal mode, and in a case where the operation of pedestrian-vehicle communicator 12 is stopped in the group terminal mode, the operation of pedestrian-vehicle communicator 12 is restarted (ST112). In addition, the process proceeds to the danger area intrusion determination (ST113) illustrated in FIG. 11.

Meanwhile, in a case where it is determined that the vehicle is not in the congestion state (NO in ST111), there is no change in the operation mode, the group terminal mode or the delegate terminal mode is maintained, and the process proceeds to the danger area intrusion determination (ST113) illustrated in FIG. 11.

In addition, in the determination of the congestion state (ST104) and the determination of releasing of the congestion state (ST111), the determination is similarly performed based on the number of the peripheral terminals. However, in the determination of the congestion state and the determination of the releasing of the congestion state, since the threshold value of the number of peripheral terminals differs, the process does not return to the normal mode immediately after switching to the group terminal mode or the delegate terminal mode in a congestion state.

In addition, in the present embodiment, in a case where the number of peripheral terminals becomes equal to or less than the second threshold value and the congestion state is released, the delegate terminal mode and the group terminal mode are released and the normal mode is restored. However, the delegate terminal mode or the group terminal mode may be released and the normal mode may be restored when a predetermined time (for example, 10 minutes) has elapsed after shifting from the normal mode to the delegate terminal mode or the group terminal mode. In this case, after returning to the normal mode, the congestion state is determined, and in a case where the congestion state is still continuing, it is necessary to move to the delegate terminal mode and the group terminal mode again.

In addition, the determination about whether or not the pedestrian has entered the danger area in ST113 may be omitted, and ST114 to ST117 may be executed regardless of the area.

In addition, as described as another example of the present embodiment, even in a case where the pedestrian is located at the outer circumference of the pedestrian group, in a case where the pedestrian is not at a location close to the high-risk area, in order to stop the pedestrian-vehicle communication considering pedestrian terminal device 1 of the pedestrian as the group terminal, in FIG. 8, controller 15 of pedestrian terminal device 1 further includes a close state determiner which determines whether or not is close to the high-risk area (roadway or the like), and in FIG. 10, in a case where the enclosure status is not determined (NO in ST106), the close state determiner determines whether or not the pedestrian is close to the high-risk area, such as the roadway, and in a case where it is determined that the pedestrian is close, the process may move to ST107.

Meanwhile, when pedestrian terminal device 1 moves to the group terminal or the delegate terminal, it is necessary to group pedestrian terminal devices 1 which move to the group terminal and the delegate terminal, respectively.

Here, in the present embodiment, the delegate terminal notification is transmitted from pedestrian terminal device 1 that becomes the delegate terminal to surrounding pedestrian terminal device 1. The delegate terminal notification notifies the surrounding pedestrian terminal device 1 that pedestrian terminal device 1 which becomes the delegate terminal exists, and the delegate terminal notification includes identification information of pedestrian terminal device 1 (terminal ID, MAC address or the like), location information, and the like.

In addition, in another pedestrian terminal device 1, in a case of receiving the delegate terminal notification from pedestrian terminal device 1 that becomes the delegate terminal, and satisfying a predetermined group formation condition, the operation mode moves to the group terminal mode. At this time, a case where pedestrian terminal device 1 exists within a predetermined range (group formation area) with reference to pedestrian terminal device 1 that becomes the delegate terminal is assumed as a group formation condition, and pedestrian terminal device 1 which satisfies the group formation condition forms a group which that considers pedestrian terminal device 1 that becomes the delegate terminal as a common delegate terminal.

In addition, in pedestrian terminal device 1 which becomes the group terminal, when moving the group terminal mode, a group terminal request is transmitted to pedestrian terminal device 1 that serves as the transmission destination of the delegate terminal notification. The group terminal request requests that the pedestrian terminal device performs communication as the group terminal considering pedestrian terminal device 1 which is the transmission destination of the delegate terminal notification as delegate terminal, and identification information (terminal ID or MAC address) of pedestrian terminal device 1 which is a request destination is added to the group terminal request.

In addition, when pedestrian terminal device 1 is grouped according to the procedure as described above, the pedestrians located in one determination area where the danger situation is similar become the same group, and the pedestrians located in each of the determination areas where the danger situations are not similar become different groups. In this case, for example, pedestrian terminal device 1 in the group terminal mode may select pedestrian terminal device 1 which is the same determination area as the pedestrian terminal device among pedestrian terminal devices 1 which are transmission destination of the delegate terminal notification, and may transmit the group terminal request to pedestrian terminal device 1.

In addition, the delegate terminal notification and the group terminal request may be transmitted by the near field communication, but may be transmitted by the pedestrian-vehicle communication.

As described above, in the present embodiment, in pedestrian terminal device 1 of the pedestrian located on the inside of the pedestrian group, in order to stop the pedestrian-vehicle communication, it is possible to reduce the number of pedestrian terminal devices 1 which perform pedestrian-vehicle communication. Accordingly, even in a situation in which multiple pedestrians are gathering, it possible to sufficiently suppress the pedestrian-vehicle communication, and to reduce communication congestion due to an increase in traffic in the pedestrian-vehicle communication.

In addition, in the present embodiment, in order to transmit and receive the notification information by the near field communication between pedestrian terminal device 1 which stopped the pedestrian-vehicle communication and pedestrian terminal device 1 that continues the pedestrian-vehicle communication, even with pedestrian terminal device 1 which stopped the pedestrian-vehicle communication, it is possible to acquire the vehicle information of vehicle-mounted terminal device 3 via pedestrian terminal device 1 which continues the pedestrian-vehicle communication, and to provide the pedestrian Information of the pedestrian himself of herself to vehicle-mounted terminal device 3. In addition, since pedestrian terminal device 1 transmits and receives the notification information by the near field communication, power consumption of pedestrian terminal device 1 can be suppressed and power saving of pedestrian terminal device 1 can be achieved.

Second Embodiment

Next, a second embodiment will be described. In addition, the points not mentioned here are the same as those in the above-described embodiment.

Figure 12:
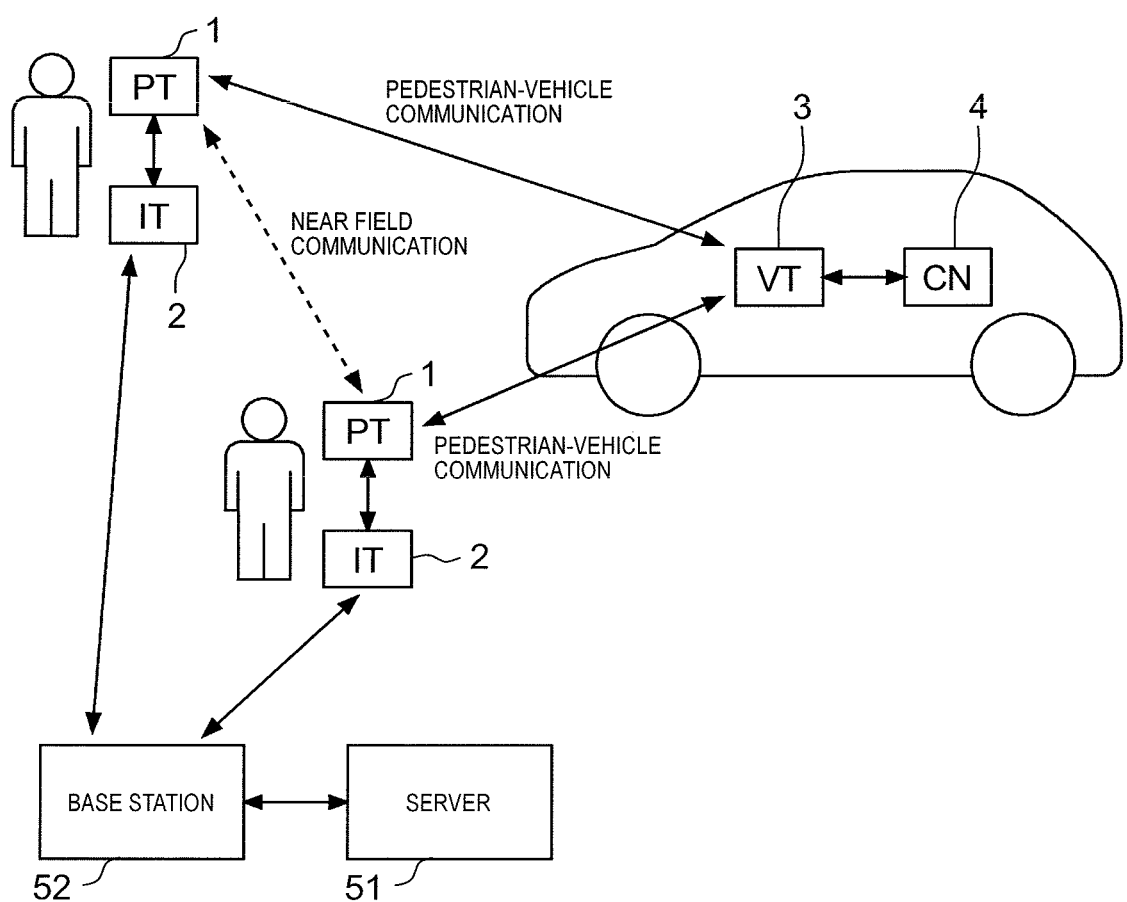
FIG. 12 is an overall configuration view of a pedestrian-to-vehicle communication system according to a second embodiment.

FIG. 12 is an overall configuration view of a pedestrian-to-vehicle communication system according to the second embodiment.

In the first embodiment, pedestrian terminal device 1 itself determines whether or not the pedestrian-vehicle communication should be stopped as a group terminal, but in the second embodiment, server (pedestrian-to-vehicle communication control device) 51 is provided, and the server 51 determines pedestrian terminal device 1 for stopping the pedestrian-vehicle communication as a group terminal and pedestrian terminal device 1 for continuing pedestrian-vehicle communication as a delegate terminal.

Pedestrian terminal device 1 can communicate with server 51 via portable information terminal device 2 and base station 52, such as a mobile phone network or a wireless LAN, and transmits the location information of the pedestrian terminal device to server 51.

Based on the location information collected from pedestrian terminal device 1, server 51 determines whether to stop the pedestrian-vehicle communication for each pedestrian terminal device 1, that is, whether the periphery of the pedestrian who carries each pedestrian terminal device 1 is the congestion state or the enclosure status, and with respect to each pedestrian terminal device 1, it is determined to perform the communication in any operation mode of the normal mode, the group terminal mode, and the delegate terminal, and the communication command for instructing the communication in the determined operation mode is transmitted to each pedestrian terminal device 1.

Figure 13:
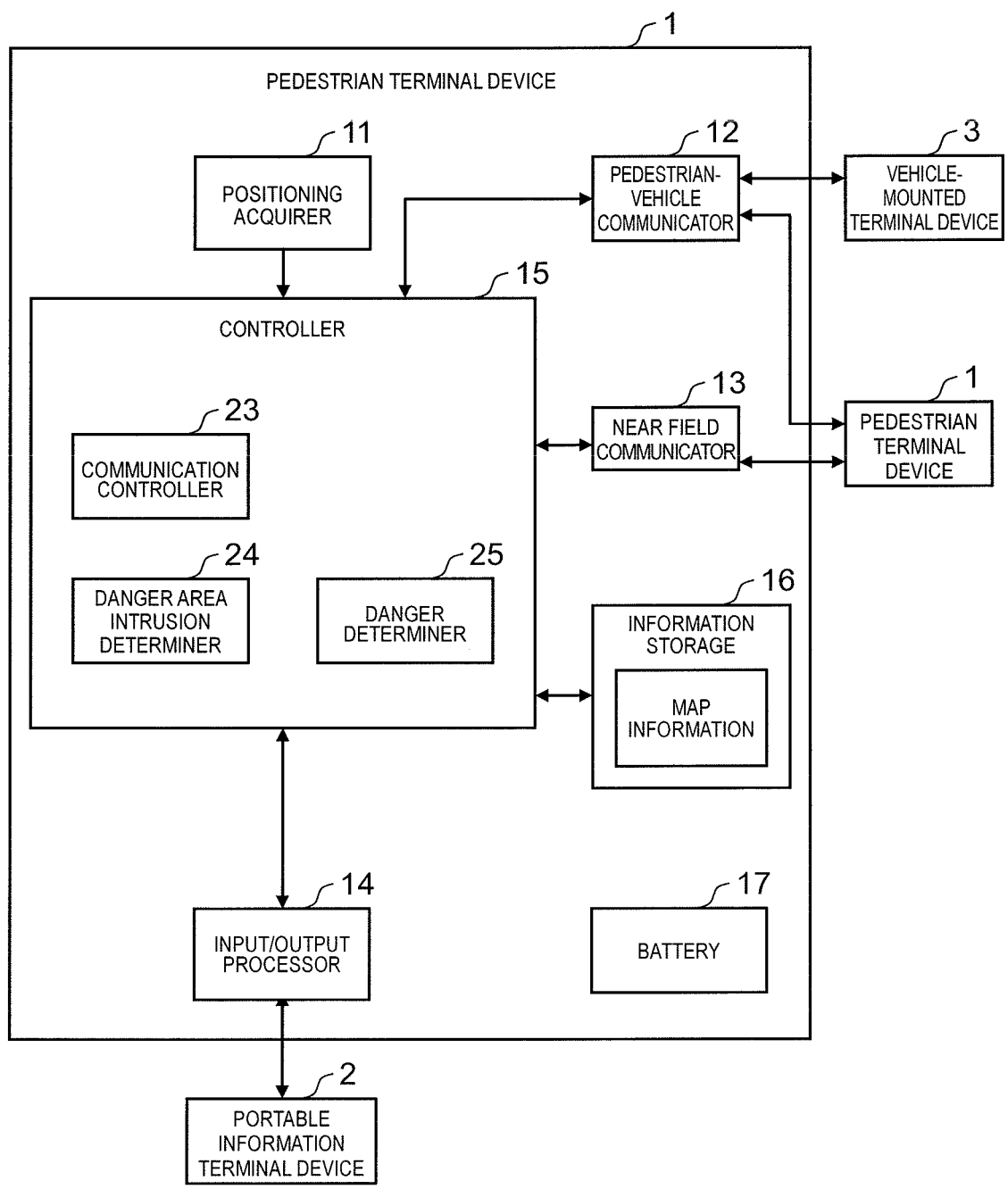
FIG. 13 is a block diagram illustrating a schematic configuration of pedestrian terminal device 1.

Next, a schematic configuration of pedestrian terminal device 1 will be described. FIG. 13 is a block diagram illustrating a schematic configuration of pedestrian terminal device 1.

Similar to first embodiment (refer to FIG. 8), pedestrian terminal device 1 includes positioning acquirer 11, pedestrian-vehicle communicator 12, near field communicator 13, input/output processor 14, controller 15, information storage 16, and battery 17. Controller 15 includes communication controller 23, danger area intrusion determiner 24, and danger determiner 25. However, congestion state determiner 21 and enclosure status determiner 22 which are provided in controller 15 in the first embodiment are omitted.

In addition, in the present embodiment, the communication with server 51 is performed by using the network communication function of portable information terminal device 2, but pedestrian terminal device 1 itself may include a communicator which performs the communication with server 51 via a network, such as a mobile phone network or a wireless LAN.

Figure 14:
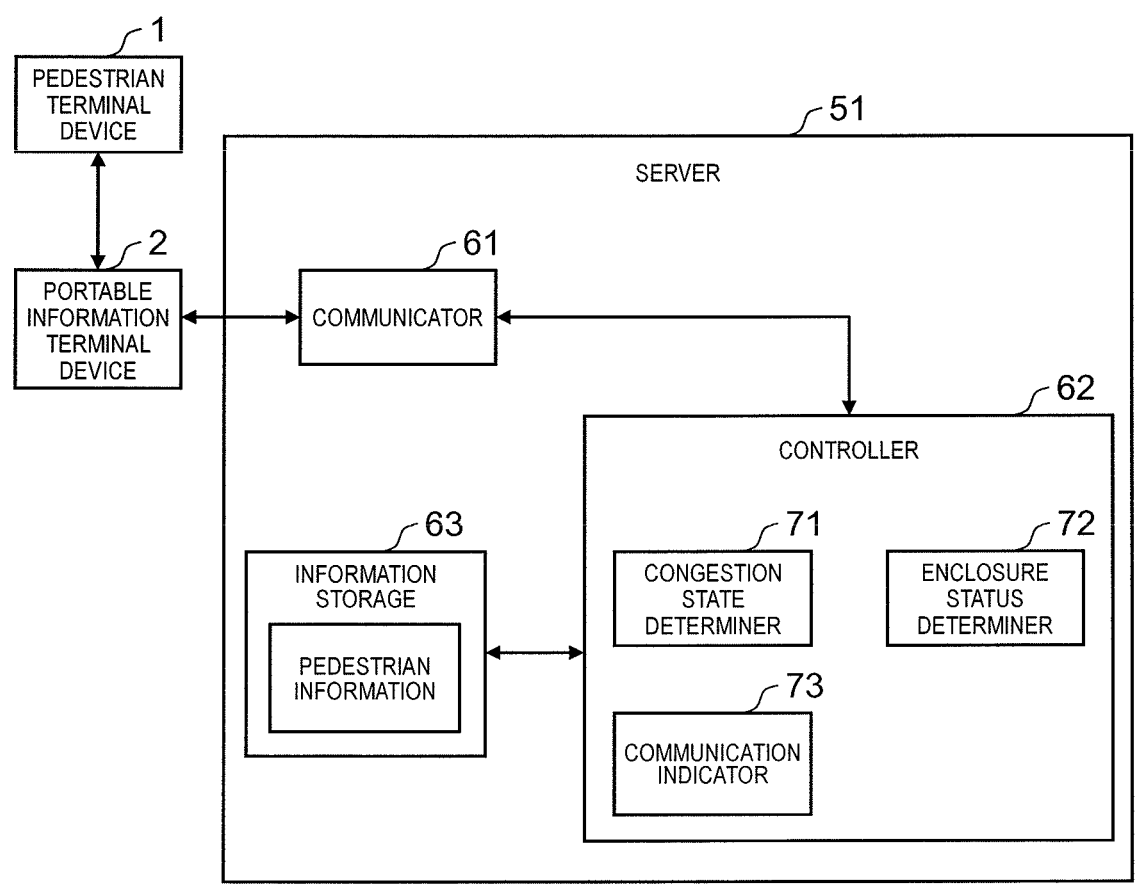
FIG. 14 is a block diagram illustrating a schematic configuration of server 51.

Next, a schematic configuration of server 51 will be described. FIG. 14 is a block diagram illustrating a schematic configuration of server 51.

Server 51 includes communicator 61, controller 62, and information storage 63.

Communicator 61 receives the pedestrian information transmitted from pedestrian terminal device 1 via portable information terminal device 2 and base station 52, such as a mobile phone network or a wireless LAN.

In information storage 63, the pedestrian information of each pedestrian terminal device 1 received by communicator 61 is accumulated.

Controller 62 includes congestion state determiner 71, enclosure status determiner 72, and communication indicator 73. Controller 62 is configured with a processor, and each part of controller 62 is realized by causing the processor to execute the program stored in information storage 63.

Congestion state determiner 71 determines the surrounding congestion state for each pedestrian terminal device 1. In the present embodiment, based on the pedestrian information accumulated in information storage 63, pedestrian terminal device 1 which exists in the vicinity of pedestrian terminal device 1 which is the determination target is counted to acquire the number of peripheral terminals, and in a case where the number of peripheral terminals becomes equal to or greater than a predetermined first threshold value (for example, 300), the congestion state is determined.

Here, the threshold value used for determining the congestion state may be variable in accordance with time, weather conditions, or the like. For example, at night or in bad weather, there is a possibility that pedestrian detection may be delayed, and thus, the threshold value may be set to a large value. In addition, for locations where the frequency of traffic accidents is higher than that in other places, the threshold value may be set to a large value.

In addition, in the present embodiment, the number of peripheral terminals is acquired by counting pedestrian terminal devices 1, but the number of peripheral terminals may include vehicle-mounted terminal device 3. In this case, the vehicle information transmitted from vehicle-mounted terminal device 3 may be received by server 51, and vehicle-mounted terminal device 3 may be counted based on the vehicle information.

In enclosure status determiner 72, based on the location information of pedestrian terminal device 1, it is determined whether or not the pedestrian who carries pedestrian terminal device 1 which is the determination target is in an enclosure status of being surrounded by other nearby pedestrians.

Based on the determination results of congestion state determiner 71 and enclosure status determiner 72, communication indicator 73 determines whether to perform the communication in any operation mode of the normal mode, the group terminal mode, and the delegate terminal, and the communication in the determined operation mode is instructed to each pedestrian terminal device 1. In response to this, communicator 61 transmits a communication command to each pedestrian terminal device 1.

Figure 15:
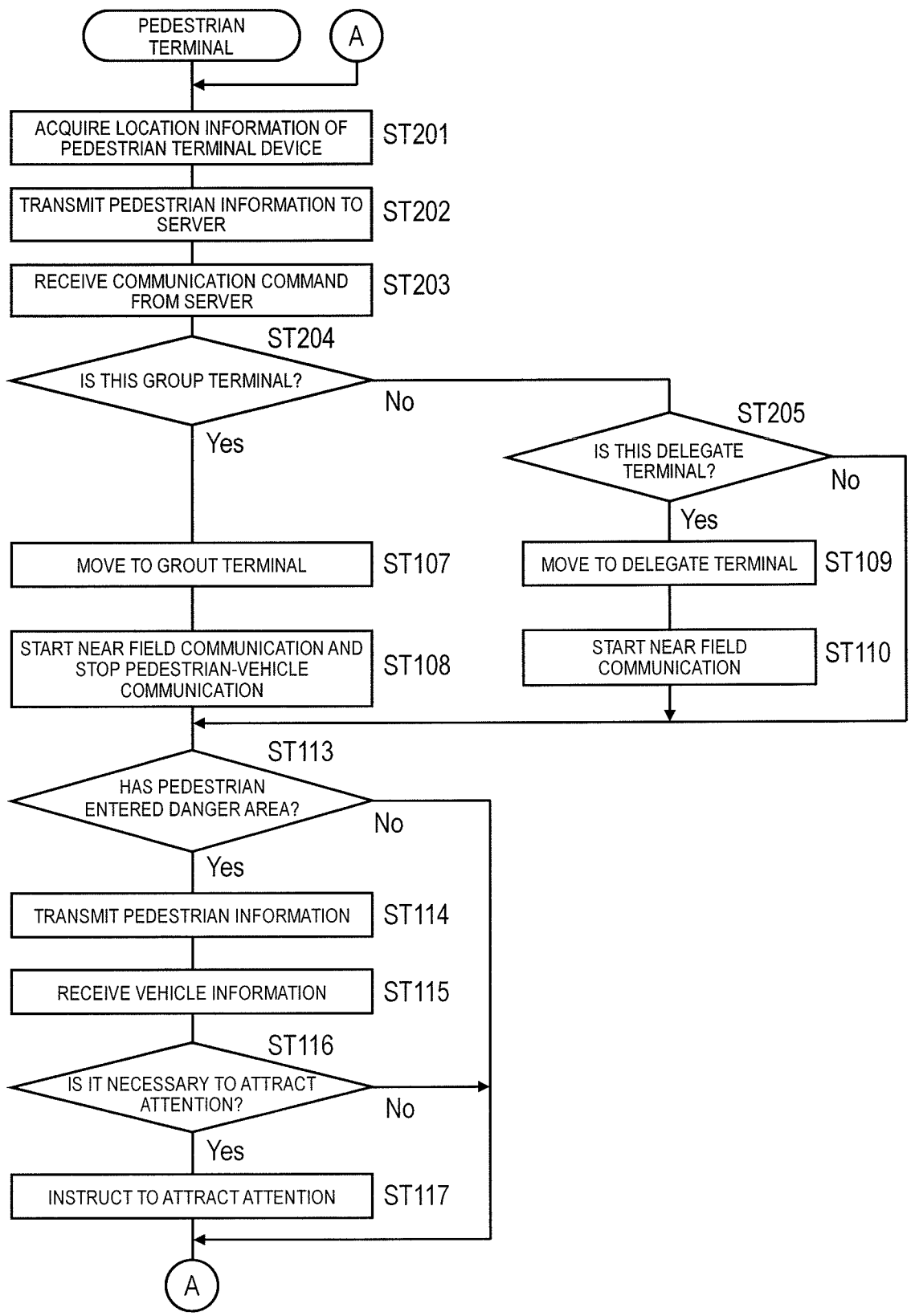
FIG. 15 is a flowchart illustrating a procedure of processing performed by pedestrian terminal device 1.

Next, a procedure of processing performed by pedestrian terminal device 1 will be described. FIG. 15 is a flowchart illustrating the procedure of processing performed by pedestrian terminal device 1.

In pedestrian terminal device 1, first, the location information of the pedestrian terminal device is acquired in positioning acquirer 11 (ST201). In addition, the pedestrian information of the pedestrian terminal device is output from input/output processor 14 to portable information terminal device 2, and the pedestrian information of the pedestrian terminal device is transmitted from portable information terminal device 2 to server 51 (ST202). Next, portable information terminal device 2 receives the communication command transmitted from server 51, and the communication command is acquired by input/output processor 14 (ST203).

In addition, communication controller 23 determines whether or not the communication command of server 51 instructs the movement to the group terminal (ST204). Here, when the communication command instructs the movement to the group terminal (YES in ST204), the process proceeds to the group terminal mode (ST107). The procedure thereafter is the same as the procedure illustrated in FIGS. 10 and FIG. 11.

Meanwhile, when the communication command does not instruct the movement to the group terminal mode (NO in ST204), then, it is determined whether or not the communication command instructs the movement to the delegate terminal mode (ST205). Here, when the communication command instructs the movement to the delegate terminal mode (YES in ST205), the process proceeds to the delegate terminal mode (ST109). The procedure thereafter is the same as the procedure illustrated in FIG. 10 and FIG. 11.

In addition, when the communication command does not instruct the movement to the group terminal mode or the delegate terminal mode, that is, when the instruction instructs the normal mode (NO in ST205), after the normal mode is maintained, or the group terminal mode or the delegate terminal mode is released and the normal mode is restored, the process proceeds to a danger area intrusion determination (ST113).

Figure 16:
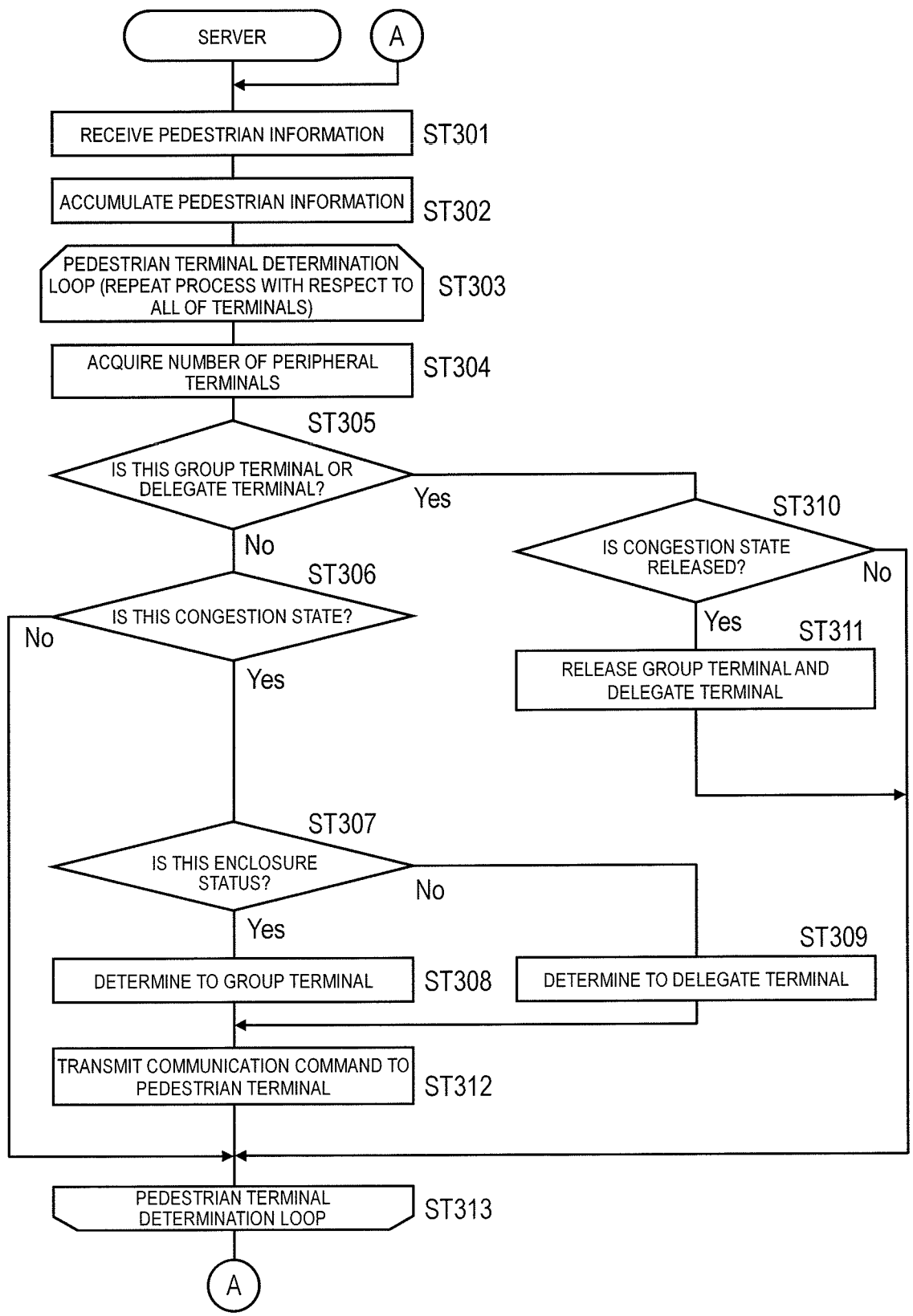
FIG. 16 is a flowchart illustrating a procedure of processing performed by server 51.

Next, a procedure of processing performed by server 51 will be described. FIG. 16 is a flowchart illustrating a procedure of processing performed by server 51.

In server 51, first, communicator 61 receives the pedestrian information transmitted from each peripheral pedestrian terminal device 1 (ST301). In addition, the pedestrian information received by communicator 61 is accumulated in information storage 63 (ST302).

Next, processing of determining the operation mode of each pedestrian terminal device 1 and transmitting the communication command for instructing the communication in the operation mode to each pedestrian terminal device is repeated with respect to all the pedestrian terminal devices 1 (ST303 to ST312).

In the processing, first, in congestion state determiner 71, based on the location information included in the pedestrian information accumulated in information storage 63, pedestrian terminal device 1 which exists around pedestrian terminal device 1 which is the target is counted and the number of peripheral terminals is acquired (ST304). In addition, it is determined whether or not pedestrian terminal device 1 which is the target has already moved to the group terminal or the delegate terminal (ST305).

Here, in a case where pedestrian terminal device 1 which is the target has not moved to the group terminal or the delegate terminal yet (NO in ST305), then, it is determined whether or not the periphery of pedestrian terminal device 1 which is the target is in the congestion state by comparing the number of peripheral terminals with the first threshold value (ST306).

Here, in a case where it is determined that the number of peripheral terminals is equal to or greater than the first threshold value and the peripheral terminal is in a congestion state (YES in ST 306), then in enclosure status determiner 72, based on the location information of pedestrian terminal device 1, it is determined whether or not the pedestrian who carries pedestrian terminal device 1 which is a determination target is in an enclosure status of being surrounded by other nearby pedestrians (ST307).

Here, when it is determined that the terminal is in the enclosure status (YES in ST307), pedestrian terminal device 1 which is the target is determined as the group terminal mode (ST308). In addition, a communication command for instructing the movement to the group terminal is transmitted to pedestrian terminal device 1 (ST312). Meanwhile, in a case where it is determined that the terminal is not in the enclosure status (NO in ST307), pedestrian terminal device 1 which is the target is determined as the delegate terminal (ST309). In addition, a communication command for instructing the movement to the delegate terminal is transmitted to pedestrian terminal device 1 (ST312).

In addition, in a case where pedestrian terminal device 1 which is the target that has already moved to the group terminal or the delegate terminal (YES in ST305), next, in congestion state determiner 71, it is determined whether or not the congestion state has been released by comparing the number of peripheral terminals with the second threshold value (ST310).

Here, in a case where it is determined that the number of peripheral terminals is equal to or less than the second threshold value and the congestion state has been released (YES in ST310), the group terminal or the delegate terminal of pedestrian terminal device 1 which is the target is released (ST311). In addition, a communication command for instructing the restoration to the normal mode is transmitted to pedestrian terminal device 1 (ST312).

Meanwhile, in a case where it is determined that the mobile terminal is not in a congestion state (NO in ST306) or in a case where it is determined that the congestion state has not been released (NO in ST310), the operation mode is not changed, and the communication command is transmitted.

In addition, the determination about whether or not the pedestrian has entered the danger area in ST113 may be omitted, and ST114 to ST117 may be executed regardless of the area.

In addition, even in a case where the pedestrian is located at the outer circumference of the pedestrian group, in a case where the pedestrian is not at a location close to the high-risk area, in order to stop the pedestrian-vehicle communication considering pedestrian terminal device 1 of the pedestrian as the group terminal, in FIG. 14, controller 62 of server 51 further includes a close state determiner which determines whether or not pedestrian terminal device 1 is close to the high-risk area (roadway or the like), and in FIG. 16, in a case where the enclosure status is not determined (NO in ST307), the close state determiner determines whether or not pedestrian terminal device 1 is close to the high-risk area, such as the roadway, and in a case where it is determined that pedestrian terminal device 1 is not close, the process may move to ST308.

Meanwhile, In the present embodiment, in server 51, similar to a case of pedestrian terminal device 1 (refer to FIGS. 10 and 11), determination of the congestion state and the like is performed for each pedestrian terminal device 1 one by one, but based on the location information of the pedestrian gathered from pedestrian terminal device 1, it is determined whether each of the pedestrians are located on the inside or at the outer circumference of the pedestrian group by detecting the pedestrian group from the distribution situation of the pedestrians, and based on the determination result, the operation mode of each pedestrian terminal device 1 may be determined.

Third Embodiment

Next, a third embodiment will be described. In addition, the points not mentioned here are the same as those in the above-described embodiment.

Figure 17:
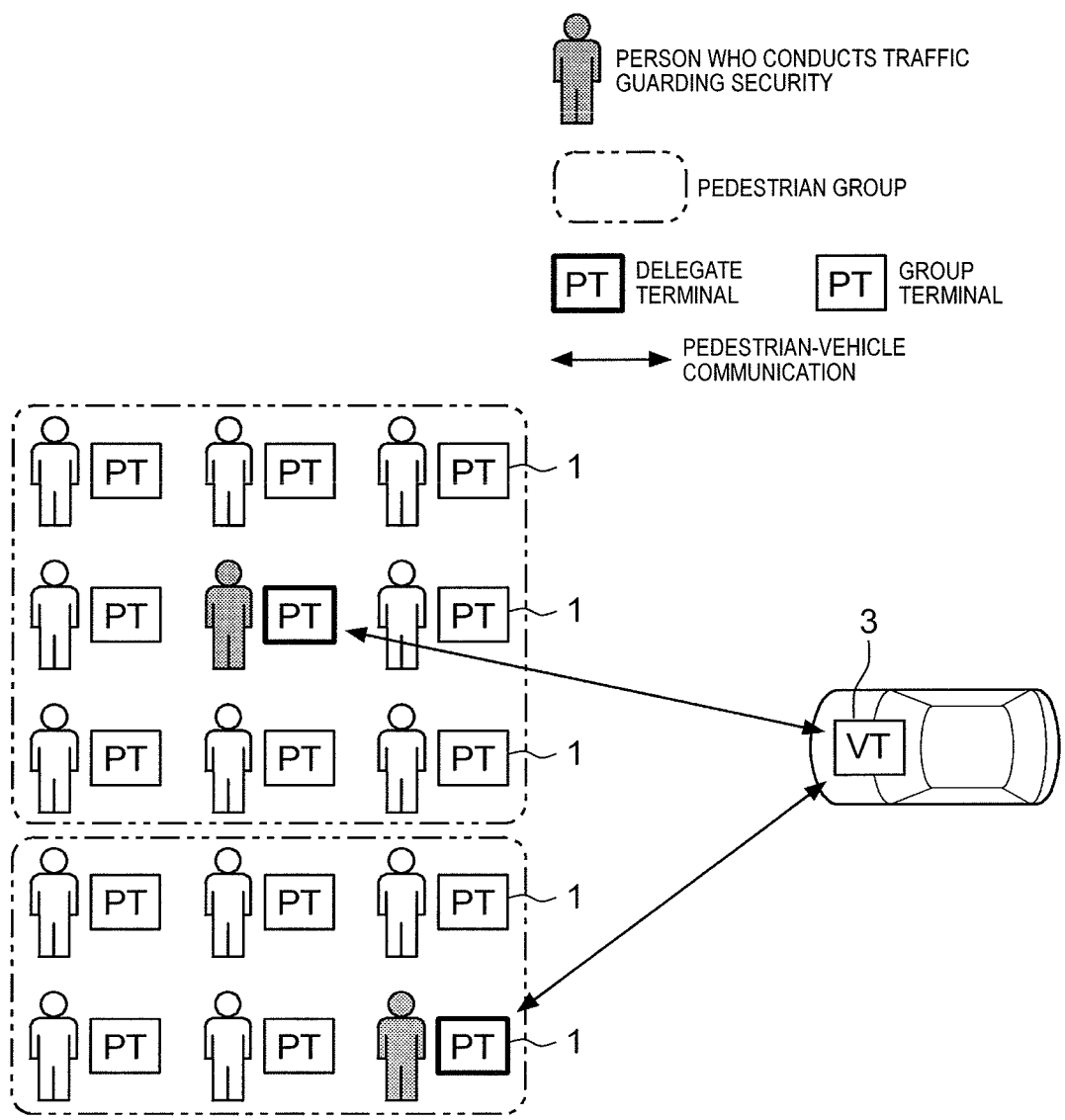
FIG. 17 is an explanatory view illustrating an example of a situation in which pedestrian-vehicle communication is stopped in pedestrian terminal device 1 in a third embodiment.

FIG. 17 is an explanatory view illustrating an example of a situation in which the pedestrian-vehicle communication is stopped in pedestrian terminal device 1 in the third embodiment.

On roadways congested with the pedestrians, there is a case where police officers or security guards conduct traffic guarding security. In such a case, a general pedestrian in the vicinity of a person who conducts traffic guarding security acts in accordance with instructions of a person who conducts traffic guarding security, and safety of a general pedestrian is ensured by a person who conducts the traffic guarding security. Therefore, there is a low necessity that pedestrian terminal device 1 attracts attention of general pedestrians.

Here, in the present embodiment, in pedestrian terminal device 1 of a general pedestrian, in a case where pedestrian terminal device 1 carried by a person who conducts traffic guarding security exists close to a pedestrian who carries the pedestrian terminal device, the pedestrian-vehicle communication is stopped. In other words, pedestrian terminal device 1 of the person who conducts the traffic guarding security is preferentially set to the delegate terminal, and pedestrian terminal device 1 of the general pedestrian which exists in the vicinity thereof is set as the group terminal.

In particular, in the present embodiment, person identification information related on a person who carries the pedestrian terminal device is stored in information storage 16 of pedestrian terminal device 1 in advance, and by the person identification information, it is possible to identify whether or not the person who carries pedestrian terminal device 1 is a person who performs traffic guarding security.

In pedestrian terminal device 1, in a case where the person who carries the pedestrian terminal device is a person who conducts traffic guarding security based on the person identification information stored in information storage 16, the terminal moves to the delegate terminal and the pedestrian-vehicle communication continues.

Meanwhile, in a case where the person who carries the pedestrian terminal device is not a person who conducts traffic guarding security, that is, in a case where the person who carries the pedestrian terminal device is a general pedestrian, in pedestrian-vehicle communicator 12, the pedestrian information including the location information and the person identification information transmitted from another pedestrian terminal device 1 by the pedestrian-vehicle communication is received, and in controller 15, based on the location information of the pedestrian terminal device and the location information and the person identification information of another pedestrian terminal device 1, in a case where a person who conducts traffic guarding security exists within a predetermined range (for example, 3 m) centering on the person who carries the pedestrian terminal device, the terminal moves to the group terminal and the pedestrian-vehicle communication is stopped.

In addition, in the present embodiment, pedestrian terminal device 1 carried by a general pedestrian acquires the person identification information from the surrounding pedestrian terminal device 1 so as to voluntarily move to the group terminal, but in accordance with the instruction from pedestrian terminal device 1 carried by the person who conducts the traffic guarding security, pedestrian terminal device 1 located within a predetermined range centered on pedestrian terminal device 1 carried by the person who conducts the traffic guarding security, is moved to the group terminal and the pedestrian-vehicle communication may be stopped.

Here, even in a case where the person who conducts the traffic guarding security is not located at the outer circumference of the pedestrian group, it is possible to ensure safety of the surrounding pedestrian including the pedestrian located at the outer circumference of the pedestrian group. Here, instead of pedestrian terminal device 1 of the pedestrian located at the outer circumference of the pedestrian group, pedestrian terminal device 1 of the person who conducts the traffic guarding security is the delegate terminal. In other words, in pedestrian terminal device 1 carried by the person who conducts traffic guarding security, the terminal becomes a delegate terminal even in a case where the person who conducts the traffic guarding security is not located at the outer circumference of the pedestrian group. In addition, in pedestrian terminal device 1 of the pedestrian located at the outer circumference of the pedestrian group, in a case where a person who conducts the traffic guarding security exists in the vicinity of the pedestrian, the terminal is moved to the group terminal without moving to the delegate terminal, the pedestrian-vehicle communication is stopped.

Fourth Embodiment

Next, a fourth embodiment will be described. In addition, the points not mentioned here are the same as those in the above-described embodiment.

Figure 18:
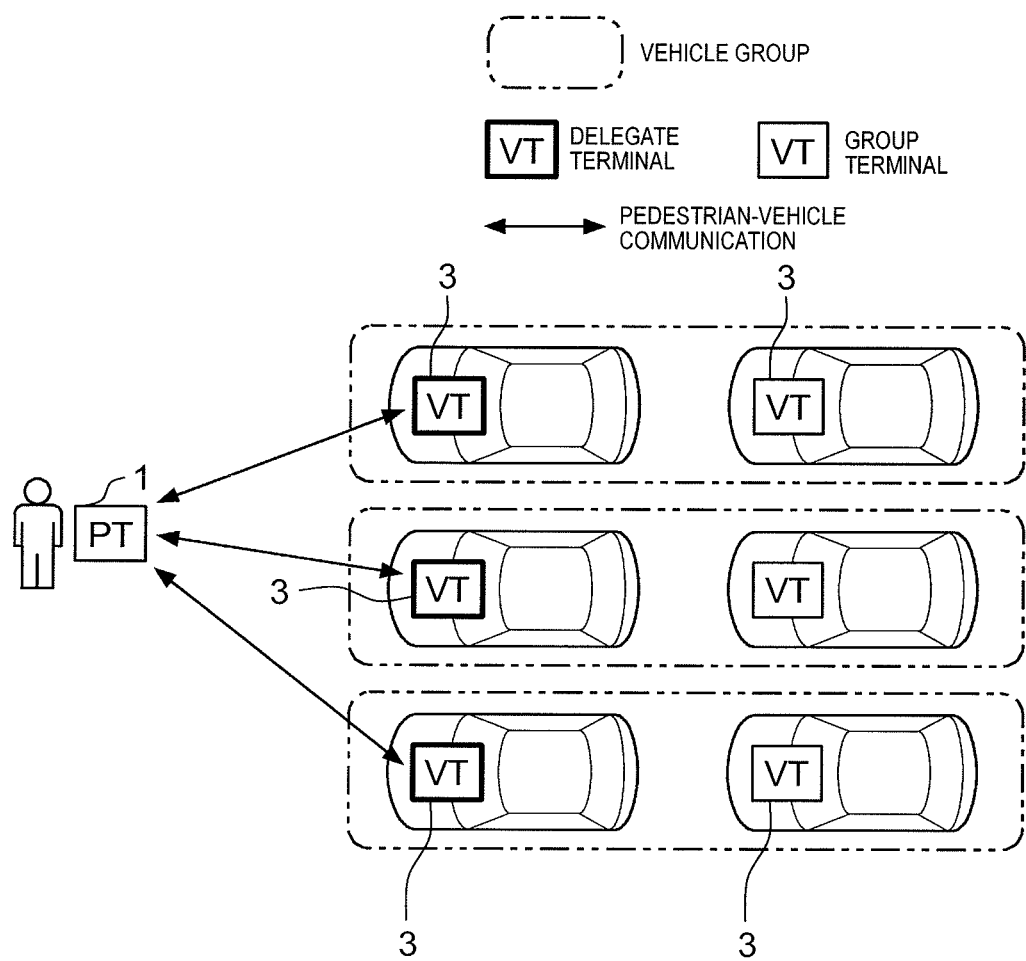
FIG. 18 is an explanatory view illustrating an example of the situation in which pedestrian-vehicle communication is stopped in vehicle-mounted terminal device 3 in a fourth embodiment.

FIG. 18 is an explanatory view illustrating an example of the situation in which the pedestrian-vehicle communication is stopped in vehicle-mounted terminal device 3 in the fourth embodiment.

In the above-described embodiment, a case where multiple pedestrians form a group is considered as a target, but in the fourth embodiment, a case where multiple vehicles form a group is considered as a target. For example, in a case where vehicles are congested on a roadway or in a case where multiple vehicles are parked similar to a parking lot of a large-scale commercial facility, similarly to a pedestrian, there is a case where multiple vehicles are densely grouped and form a group. In this case, when the number of vehicle-mounted terminal devices 3 exceeds the limit (for example, 300 units) of the pedestrian-vehicle communication, congestion of the pedestrian-vehicle communication occurs.

Here, in the present embodiment, the pedestrian-vehicle communication in vehicle-mounted terminal device 3 is controlled, and in a case where the vehicle equipped with the pedestrian terminal device is located on the inside of the vehicle group, the pedestrian-vehicle communication is stopped.

In a situation in which multiple vehicles are densely gathering, it is unlikely to consider a case where a vehicle located on the inside of the vehicle group suddenly collides with a pedestrian on the outside of the vehicle group, and in a case where the vehicle is located on the inside of the vehicle group, there will be no problem even when the pedestrian-vehicle communication is stopped.

Specifically, in pedestrian-vehicle communicator 32 of vehicle-mounted terminal device 3, the vehicle information transmitted from another vehicle-mounted terminal device 3 which exists around the pedestrian terminal device is received, and in controller 34, based on the location information of the pedestrian terminal device and another vehicle-mounted terminal device 3, it is determined whether or not the vehicle equipped with the pedestrian terminal device is located on the inside of the vehicle group, that is, whether or not the vehicle equipped with the pedestrian terminal device is in an enclosure status of being surrounded by other nearby vehicles, and in a case where the vehicle is not in the enclosure status, the vehicle-mounted terminal device continues the pedestrian-vehicle communication as the delegate terminal, and in a case where the vehicle is in the enclosure status, the vehicle-mounted terminal device stops the pedestrian-vehicle communication as the group terminal.

In addition, even in a case where the vehicle is located at the outer circumference of the vehicle group, in a case where the pedestrian is not close to the area where the pedestrian walks, the possibility of the vehicle colliding with the pedestrian is low. Here, in vehicle-mounted terminal device 3, in a case where the vehicle equipped with the pedestrian terminal device is not close to the area where the pedestrian walks similar to the pedestrian crossing, and another vehicle exists between the host vehicle and the pedestrian, the pedestrian-vehicle communication which serves as the group terminal may be stopped.

Specifically, in pedestrian-vehicle communicator 32 of vehicle-mounted terminal device 3, controller 34 determines whether or not the host vehicle is close to the area where the pedestrian walks based on the location information of the host vehicle and the map information, and in a case where the host vehicle is not close to the area where the pedestrian walks, the pedestrian-vehicle communication is stopped. In addition, based on the location information of the host vehicle and another vehicle and the location information of the pedestrian, it is determined whether or not another vehicle exists between the host vehicle and the pedestrian, and in a case where another vehicle exists between the vehicle and the pedestrian, the pedestrian-vehicle communication is stopped.

In addition, in the present embodiment, vehicle-mounted terminal device 3 itself determines whether to stop the pedestrian-vehicle communication, that is, whether to move to any of the delegate terminal and the group terminal, but similar to the second embodiment, server 51 may determines whether to stop the pedestrian-vehicle communication.

As described above, the embodiment is described as an example of the technology disclosed in the present application. However, the technology in the present disclosure is not limited thereto, and can also be applied to embodiments in which change, replacement, addition, and omission are performed. In addition, it is also possible to combine each of the configuration elements described in the above-described embodiments to provide a new embodiment.

For example, in the above-described embodiment, an example in which a pedestrian, that is, a person who walks on a roadway carries a pedestrian terminal device has been described. However, a person who carries a pedestrian terminal device and gets on a vehicle, such as a bicycle, an electric vehicle for the elderly, an electric wheelchair, or an agricultural machine may also be included as a pedestrian in a broad sense.

In addition, in the present embodiment, the vehicle-mounted terminal device is described as an example mounted on an automobile (four-wheeled vehicle). However, the vehicle on which the vehicle-mounted terminal device is mounted may be a motorcycle or the like, and furthermore, the one on which the vehicle-mounted terminal device is mounted is not limited to a vehicle, and may be a robot or a small aircraft such as a drone.

In addition, even in a case where the embodiment is applied to services other than danger avoidance, congestion reduction of communication traffic or power saving of the pedestrian terminal device can be achieved.

For example, in a case of calling a tourist, the pedestrian terminal devices of a plurality of tourists are grouped, and only the delegate terminal performs the pedestrian-vehicle communication with the vehicle-mounted terminal device installed in the sightseeing bus. In this case, the delegate terminal may select a person at the head of the group. The delegate terminal also notifies the vehicle-mounted terminal device of the calls of other pedestrian terminal devices of the group.

In addition, for example, in a case where a plurality of persons desire to acquire specific information at a large event or the like, the pedestrian terminal devices of a plurality of persons who desire to acquire the same information, such as player information in the stadium are set as a group, and only the delegate terminal performs the pedestrian-vehicle communication with the communication machine (vehicle-mounted terminal device) installed in the stadium. In this case, the delegate terminal may select a person who is the closest to the communication machine (vehicle-mounted terminal device). The information acquired by the delegate terminal is notified from the delegate terminal to the other pedestrian terminal device of the group.

In addition, for example, in a case where it is desired to preferentially allocate a vehicle to an elderly person, the pedestrian terminal devices of a plurality of persons who desire to get on a vehicle are set as a group, and only the delegate terminal thereof performs the pedestrian-vehicle communication with the vehicle-mounted terminal device installed on the vehicle. In this case, the delegate terminal may select the elderly who are at the head of the group. By using the age information, it is possible to give the elderly in the group services, such as preferentially ensuring buses and train seats, or preferentially assigning taxis.

In addition, for example, in a case where a plurality of vehicles desire to acquire congestion information when a traffic jam or the like occurs, the vehicle-mounted terminal devices of a plurality of vehicles which desire to acquire the same information, such as congestion information, are grouped, and only the delegate terminal acquires the congestion information. In this case, the delegate terminal may select a vehicle at the head of the group. The congestion information acquired by the delegate terminal is notified from the vehicle-mounted terminal device of other vehicles of the group from the delegate terminal.

INDUSTRIAL APPLICABILITY

A pedestrian terminal device, a vehicle-mounted terminal device, a pedestrian-to-vehicle communication control device, a pedestrian-to-vehicle communication system, and a pedestrian-to-vehicle communication method according to the present disclosure have an effect that it is possible to sufficiently suppress the pedestrian-vehicle communication between the pedestrian terminal device and the vehicle-mounted terminal device to reduce the congestion of communication due to the increase in traffic in the pedestrian-vehicle communication even in a crowded situation in which multiple pedestrians and vehicles gather, and are advantageous as a pedestrian terminal device which is carried by the pedestrian and performs the pedestrian-vehicle communication with the vehicle-mounted terminal device, a vehicle-mounted terminal device which is mounted on the vehicle and performs the pedestrian-vehicle communication with the pedestrian terminal device, a pedestrian-to-vehicle communication control device which controls the pedestrian-vehicle communication performed between the vehicle-mounted terminal device and the pedestrian terminal device, and a pedestrian-to-vehicle communication system and a pedestrian-to-vehicle communication method for performing the pedestrian-vehicle communication between the vehicle-mounted terminal device and the pedestrian terminal device.

REFERENCE MARKS IN THE DRAWINGS

1 PEDESTRIAN TERMINAL DEVICE
3 VEHICLE-MOUNTED TERMINAL DEVICE

11 POSITIONING ACQUIRER (LOCATION INFORMATION ACQUIRER)
12 PEDESTRIAN-VEHICLE COMMUNICATOR
13 NEAR FIELD COMMUNICATOR
15 CONTROLLER
21 CONGESTION STATE DETERMINER
22 ENCLOSURE STATUS DETERMINER
23 COMMUNICATION CONTROLLER
51 SERVER (PEDESTRIAN-TO-VEHICLE COMMUNICATION CONTROL DEVICE)
62 CONTROLLER
71 CONGESTION STATE DETERMINER
72 ENCLOSURE STATUS DETERMINER
73 COMMUNICATION INDICATOR

The invention claimed is:

1. A pedestrian terminal device which is carried by a pedestrian and performs pedestrian-vehicle communication with a vehicle-mounted terminal device, the pedestrian terminal device comprising:
   a satellite positioning system that acquires a location of the pedestrian terminal device;
   a pedestrian-vehicle communication device that communicates with the vehicle-mounted terminal device by the pedestrian-vehicle communication; and
   a controller that controls the pedestrian-vehicle communication device,
   wherein the pedestrian-vehicle communication device receives pedestrian information transmitted from another pedestrian terminal device that is present in the vicinity of the pedestrian terminal device, the pedestrian information including a location of the other pedestrian terminal, and
   wherein the controller determines whether or not the pedestrian who carries the pedestrian terminal device is in an enclosure status based on the location of the pedestrian terminal device and the location of the other pedestrian terminal device included in the pedestrian information, the enclosure status representing that the pedestrian who carries the pedestrian terminal is surrounded by nearby pedestrians in a pedestrian group including the pedestrian and the nearby pedestrians,
   the controller stops the pedestrian-vehicle communication in response to determining that the pedestrian who carries the pedestrian terminal device is in the enclosure status, and
   the controller performs the pedestrian-pedestrian-vehicle communication in response to determining that the pedestrian who carries the pedestrian terminal device is located at an outer circumference of the pedestrian group.

2. The pedestrian terminal device of claim 1, further comprising:
   a near field communication device that communicates with the other pedestrian terminal device by near field communication,
   wherein, in a case of stopping the pedestrian-vehicle communication, the notification information is transmitted and received by the near field communication to and from the other pedestrian terminal device that does not stop the pedestrian-vehicle communication.

3. The pedestrian terminal device of claim 1, further comprising:
   a near field communication device that communicates with the other pedestrian terminal device by near field communication,
   wherein, in a case where the pedestrian-vehicle communication is not stopped, the notification information is transmitted and received by the near field communication to and from the other pedestrian terminal device which stopped the pedestrian-vehicle communication.

4. The pedestrian terminal device of claim 1,
   wherein the controller stops the pedestrian-vehicle communication in a case where the pedestrian who carries the pedestrian terminal device is not positioned at a location close to a high-risk area, based on the location of the pedestrian terminal device and the location of the other pedestrian terminal device and map information.

5. The pedestrian terminal device of claim 2,
   wherein the controller transmits and receives the notification information by the near field communication with the other pedestrian terminal device having a similar risk situation, based on the location of the pedestrian terminal device and the location of the other pedestrian terminal device and map information.

6. The pedestrian terminal device of claim 1,
   wherein the controller stops the pedestrian-vehicle communication in a case where a specific pedestrian terminal device carried by a person who conducts traffic guarding security is present within a predetermined range centering on the pedestrian who carries the pedestrian terminal device, based on the location of the pedestrian terminal device and the location and person identification information of the other pedestrian terminal device included in the notification information.

7. The pedestrian terminal device according to claim 1, wherein the controller determines that the pedestrian is in the enclosure status, when at least one of the nearby pedestrians is present in each of a plurality of divided areas which are created by dividing an area centered on the pedestrian into a plurality of substantially equal areas.

8. A vehicle-mounted terminal device which is mounted on a vehicle and performs pedestrian-vehicle communication with a pedestrian terminal device, the vehicle-mounted terminal device comprising:
   a satellite positioning system that acquires a location of the vehicle-mounted terminal device;
   a pedestrian-vehicle communication device that communicates with the pedestrian terminal device by the pedestrian-vehicle communication; and
   a controller that controls the pedestrian-vehicle communication device,
   wherein the pedestrian-vehicle communication device receives notification information transmitted from another vehicle-mounted terminal device that is present in the vicinity of the vehicle-mounted terminal device, the notification information including a location of the other vehicle-mounted terminal, and
   wherein the controller determines whether or not a vehicle on which the vehicle-mounted terminal device is mounted is in an enclosure status based on the location of the vehicle-mounted terminal device and the location of the other vehicle-mounted terminal device included in the notification information, the enclosure status representing that the vehicle on which the vehicle-mounted terminal device is mounted is surrounded by nearby vehicles in a vehicle group including the vehicle and the nearby vehicles,
   the controller stops the pedestrian-vehicle communication in response to determining that the vehicle is in the enclosure status, and
   the controller performs the pedestrian-vehicle communication in response to determining that the vehicle on which the vehicle-mounted terminal device is mounted is located at an outer circumference of the vehicle group.

9. A pedestrian-to-vehicle communication control device which controls pedestrian-vehicle communication performed between a vehicle-mounted terminal device mounted on a vehicle and a pedestrian terminal device carried by a pedestrian, the pedestrian-to-vehicle communication control device comprising:
- a communication device that communicates with each of a plurality of the pedestrian terminal devices; and
- a controller which controls the pedestrian-vehicle communication in each of the plurality of pedestrian terminal devices;
- wherein the communication device receives location information transmitted from each of the plurality of pedestrian terminal devices,
- wherein the controller determines whether or not a pedestrian who carries each of the plurality of pedestrian terminal devices is in an enclosure status based on the location information transmitted from each of the plurality of pedestrian terminal devices, the enclosure status representing that the pedestrian is surrounded by nearby pedestrians in a pedestrian group including the pedestrian and the nearby pedestrians,
- the controller instructs the pedestrian terminal device to stop the pedestrian-vehicle communication in response to determining that the pedestrian who carries the pedestrian terminal device is in the enclosure status, and
- the controller instructs the pedestrian terminal device to perform the pedestrian-vehicle communication in response to determining that the pedestrian who carries the pedestrian terminal device is located at an outer circumference of the pedestrian group.

10. A pedestrian-to-vehicle communication system which includes a vehicle-mounted terminal device mounted on a vehicle and a pedestrian terminal device carried by a pedestrian, and which performs pedestrian-vehicle communication between the vehicle-mounted terminal device and the pedestrian terminal device,
- wherein the pedestrian terminal device includes:
  - a satellite positioning system that acquires a location of the pedestrian terminal device,
  - a pedestrian-vehicle communication device that communicates with the vehicle-mounted terminal device by the pedestrian-vehicle communication, and
  - a controller that controls the pedestrian-vehicle communication device,
- wherein the pedestrian-vehicle communication device receives notification information transmitted from another pedestrian terminal device that is present in the vicinity of the pedestrian terminal device, the notification information including a location of the other pedestrian terminal, and
- wherein the controller determines whether or not the pedestrian who carries the pedestrian terminal device is in an enclosure status based on the location of the pedestrian terminal device and the location of the other pedestrian terminal device included in the notification information, the enclosure status representing that the pedestrian who carries the pedestrian terminal device is surrounded by nearby pedestrians in a pedestrian group including the pedestrian and the nearby pedestrians,
- wherein the controller stops the pedestrian-vehicle communication in response to determining that the pedestrian who carries the pedestrian terminal device is in the enclosure status, and
- wherein the controller performs the pedestrian-vehicle communication in response to determining that the pedestrian who carries the pedestrian terminal device is located at an outer circumference of the pedestrian group.

11. A pedestrian-to-vehicle communication method for performing pedestrian-vehicle communication between a vehicle-mounted terminal device mounted on a vehicle and a pedestrian terminal device carried by a pedestrian, the method comprising:
- by the pedestrian terminal device,
- acquiring location information of the pedestrian terminal device;
- receiving location information transmitted from another pedestrian terminal device that is present in the vicinity of the pedestrian terminal device; and
- determining whether or not the pedestrian who carries the pedestrian terminal device is in an enclosure status based on the location information of the pedestrian terminal device and the location information transmitted from the other pedestrian terminal device, the enclosure status representing that the pedestrian who carries the pedestrian terminal device is surrounded by nearby pedestrians in a pedestrian group including the pedestrian and the nearby pedestrians,
- stopping the pedestrian-vehicle communication in response to determining that the pedestrian who carries the pedestrian terminal device is in the enclosure status, and
- performing the pedestrian-vehicle communication in response to determining that the pedestrian who carries the pedestrian terminal device is located at an outer circumference of the pedestrian group.

* * * * *